US006789867B2

(12) United States Patent
Takahashi et al.

(10) Patent No.: US 6,789,867 B2
(45) Date of Patent: Sep. 14, 2004

(54) INK JET PRINTING APPARATUS AND INK JET PRINTING METHOD

(75) Inventors: Kiichiro Takahashi, Kanagawa (JP); Naoji Otsuka, Kanagawa (JP); Hitoshi Sugimoto, Kanagawa (JP); Hitoshi Nishikori, Tokyo (JP); Osamu Iwasaki, Tokyo (JP); Minoru Teshigawara, Kanagawa (JP); Takeshi Yazawa, Kanagawa (JP); Toshiyuki Chikuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/062,525

(22) Filed: Feb. 5, 2002

(65) Prior Publication Data

US 2002/0154182 A1 Oct. 24, 2002

(30) Foreign Application Priority Data

Feb. 6, 2001 (JP) ..................... 2001-030187
Feb. 6, 2001 (JP) ..................... 2001-030189
Feb. 4, 2002 (JP) ..................... 2002-027473

(51) Int. Cl.[7] .............................. B41J 29/38; B41J 2/21
(52) U.S. Cl. .......................................... 347/12; 347/43
(58) Field of Search ................................... 347/12, 43

(56) References Cited

U.S. PATENT DOCUMENTS

| 4,313,124 A | 1/1982 | Hara ........................... 347/57 |
| 4,345,262 A | 8/1982 | Shirato et al. ................ 347/30 |
| 4,459,600 A | 7/1984 | Sato et al. .................... 347/47 |
| 4,463,359 A | 7/1984 | Ayata et al. .................. 347/56 |
| 4,558,333 A | 12/1985 | Sugitani et al. ............... 347/65 |
| 4,723,129 A | 2/1988 | Endo et al. ................... 347/56 |
| 4,740,796 A | 4/1988 | Endo et al. ................... 347/56 |
| 5,617,122 A * | 4/1997 | Numata et al. ................ 347/14 |
| 5,764,254 A * | 6/1998 | Nicoloff, Jr. et al. .......... 347/43 |
| 5,992,962 A * | 11/1999 | Yen et al. ..................... 347/9 |
| 6,102,511 A | 8/2000 | Shioya et al. .................. 347/9 |
| 6,102,537 A | 8/2000 | Kato et al. ................... 347/101 |
| 6,142,598 A | 11/2000 | Iwasaki et al. ................. 347/9 |
| 6,158,835 A * | 12/2000 | Jackson et al. ................ 347/12 |
| 6,164,756 A | 12/2000 | Takahashi et al. ............. 347/43 |
| 6,227,643 B1 * | 5/2001 | Purdell et al. ................ 347/19 |
| 6,267,476 B1 | 7/2001 | Kato et al. ................... 347/100 |

FOREIGN PATENT DOCUMENTS

| EP | 0 564 252 A2 | 10/1993 | |
| EP | 0665114 A2 | 8/1995 | |
| EP | 0709214 A2 | 5/1996 | |
| EP | 0 730 971 A2 | 9/1996 | |
| EP | 0895869 A2 | 2/1999 | |
| JP | 54-56847 | 5/1979 | ............ B41M/5/26 |
| JP | 59-123670 | 7/1984 | ............ B41J/3/04 |
| JP | 60-71260 | 4/1985 | ............ B41J/3/04 |

* cited by examiner

*Primary Examiner*—Stephen D. Meier
*Assistant Examiner*—Alfred E Dudding
(74) *Attorney, Agent, or Firm*—Fitzpatrick, Cella, Harper & Scinto

(57) ABSTRACT

The object of the present invention is to provide an ink jet printing apparatus which can realize both a high speed printing and a high quality printing without color deviations when each of the print areas is printed in a plurality of scans by a plurality of print heads ejecting different kinds of ink.

For this purse, this invention has a controller for controlling for each print head independently widths and positions of active nozzle groups in the print heads, the active nozzle groups representing those of the plurality of nozzles in the print heads which are used for printing, wherein the controller controls the widths and positions of the active nozzle groups according to a set printing condition.

42 Claims, 25 Drawing Sheets

HIGH SPEED PRINT MODE 1

HIGH SPEED PRINT MODE 2

HIGH SPEED PRINT MODE 3

▨ : ACTIVE NOZZLE
☐ : NON-ACTIVE NOZZLE

HIGH SPEED PRINT MODE 4

| 1ST PRINT AREA | PRINT TIME 1 |
|---|---|
| 2ND PRINT AREA | PRINT TIME 2 |
| 3RD PRINT AREA | PRINT TIME 3 |
| 4TH PRINT AREA | PRINT TIME 4 |
| 5TH PRINT AREA | PRINT TIME 5 |

FIG.23

INK JET PRINTING APPARATUS AND INK JET PRINTING METHOD

This application is based on Japanese Patent Application Nos. 2001-030187 and 2001-030189 filed Feb. 6, 2001 and 2002-27473 filed Feb. 4, 2002, the contents of which are incorporated hereinto by reference.

BACKGROUND OF THE INVENTION

1. Field of the Invention

The present invention relates to an ink jet printing apparatus and an ink jet printing method which create color images of high quality on a print medium by ejecting different kinds of ink from a plurality of print heads. More particularly, the invention relates to improvements on an ink jet printing apparatus and an ink jet printing method which form a printed image by performing a single print scan (one pass) or multiple print scans (multiple passes) over one print area.

The present invention is applicable to all devices that use such print media as paper, cloth, leather, non-woven cloth, OHP sheet and even metal. Applicable devices include, for example, office equipment such as printers, copying machines and facsimiles and industrial manufacturing devices.

2. Description of the Related Art

Because of its advantages such as low noise, low running cost and the ease with which the apparatus can be reduced in size and with which color printing can be introduced, the ink jet printing method has found wide uses in printers, copying machines and facsimiles.

Generally, a color ink jet printing apparatus prints color images using four colors of ink, i.e., three color inks—cyan, magenta and yellow—plus a black ink.

In the conventional ink jet printing apparatus, to obtain color images with high color saturation without a spread of ink requires the use of dedicated paper that has an ink absorbing layer. This increases the printing cost. To solve this problem, a printing apparatus has been developed in recent years which is made applicable to inexpensive "plain paper" used in large volumes in printers and copying machines by improving the inks used. However, the print quality on the "plain paper" has not yet attained a satisfactory level. The most notable factors for this are color deviations due to differences in the order of ink ejection and in the ejection time. These cause problems such as density and color deviations or deviations in the feed direction (sub-scan direction) and transverse direction (main scan direction in which the print heads are scanned) of the print medium.

Further, in the ink jet printing apparatus there are growing user needs for the printer ability to print at high speed.

When printing is done with emphasis placed on high speed, the multipass printing, which is intended to realize high quality printing, is not performed but a so-called one-pass printing is effective which prints one line in one pass. The number of passes for printing means the number of times that the carriages is scanned to complete one line.

The reason for choosing the one-pass printing is that, because the print head has a fixed number of nozzles, the greater number of passes results in a smaller feed distance that the paper is fed at one time and the fewer passes result in a larger feed. For example, if a 2-pass printing currently adopted can be changed to a one-pass printing, this can simply increase the print speed two-fold. That is, the smaller the number of passes in the multipass printing, the smaller the number of carriage scans (number of scans over a predetermined area of the print medium) and the greater the distance that the paper is fed at one time. As a result, the time it takes for one sheet to be printed decreases.

By performing a bidirectional printing in which printing is done in both the forward and backward passes of the print heads, idle scanning can be eliminated, further increasing the print speed.

For example, FIGS. 1A to 1C show comparison between different printing methods using the same print head and the same number of scans. Here, the width of the print head is defined to be one line.

FIG. 1A shows a printed state after three scans have been performed by a 2-pass bidirectional printing. The example shown here represents a case where an image is completed by two passes with 50% duty printing performed in each pass. FIG. 1A shows a print area under consideration divided into four areas each corresponding to one-half of the print width of the print head H. In a first scan in the forward direction, the top area in FIG. 1A is printed with a 50% duty by using the lower half of the print head H. In a second scan in the backward direction, the top area of FIG. 1A is printed by using the upper half of the print head H and at the same time the second area from the top is printed with a 50% duty by the lower half of the print head H. This second scan completes the printing on the top area of FIG. 1A. In a third scan in the forward direction, the second area from the top is printed by the upper half of the print head H, completing the printing on this area. At the same time, the lower half of the print head H prints on the third area from the top with a 50% duty. If the area corresponding to the print width of the print head H is taken as one line, the execution of three scans completes one line and leaves one line half-finished, as described above. Although the example of FIG. 1A shows a bidirectional printing, if the printing is done in one of the forward and backward directions, there is an idle scan, which do not execute printing, between the successive scans. The completed area therefore is 0.5 line.

In the 1-pass unidirectional printing shown in FIG. 1B, three scans produce two lines of print-completed area. Here, there is one scan that does not execute printing (which in FIG. 1B corresponds to a backward idle scan following the forward scan). In a 1-pass bidirectional printing shown in FIG. 1C, three scans produce three lines of print-completed area and this method carries out the most efficient printing operation. For high speed printing, this is an effective method.

When a conventional ink jet printing apparatus forms an image of multiple colors by 1-pass bidirectional printing, however, a problem arises that the density deviations and color deviations due to differences in the order of ink ejection and in the ejection time degrade the image quality as described below.

Difference in the Order of Ejection

When print heads of different color inks are arranged in the transverse direction (main scan direction), because the order of ejecting the inks during the forward pass differs from that during the return pass, a hue difference may occur between the printing in the forward pass and the printing in the backward pass.

For example, when a blue, a secondary color, is formed, there are two different processes, as shown in FIGS. 2A and 2B. In the first case magenta is printed first producing a blue with a strong hue of magenta. In the second case cyan is printed first to produce a blue with a strong hue of cyan. This may be explained as follows. The hue depends on the characteristics of inks and paper, and the ink printed first is adsorbed first by paper fibers and the subsequently printed ink sinks under the first printed ink. The coloring component of the first printed ink exists mostly at or near the surface of the print medium and thus the intensity of the color of that ink, i.e., the density of that ink, is relatively high.

In a state where such a phenomenon occurs, if the 1-pass bidirectional printing as shown in FIG. 1C is performed, bands of different hues are printed alternately in the forward pass (during which the print head moves from left to right) and backward pass, as shown in FIG. 3. A first print head H1 and a second print head H2 eject magenta and cyan inks, respectively, with the magenta ink printed first in the forward pass and the cyan ink printed first in the backward pass. The difference in hue caused by the alternating order of ink ejection make the printed area look like a pattern of two bands of different hues alternating every scan.

Variations in Print Time

When print heads of different color inks are arranged in the vertical direction (sub-scan direction), the order of printing the different inks on each print area can be made the same. However, in the 1-pass bidirectional printing, because one print area is printed by alternately performing the forward and backward scans on a plurality of different print heads, the time interval between the previous printing operation and the subsequent printing operation differs from one location to another in each print area. This results in ink density deviations. In addition, the successive print areas adjoin each other in such a way that their time interval deviations become maximum in the sub-scan direction.

One such image formation is shown in FIG. 4.

Here, a cyan print head (second print head H2) and a magenta print head (first print head H1) are used to form a blue. In the print head shown in FIG. 4, the upper half is a print head H2 for cyan and the lower half is a print head H1 for magenta, with print heads H1 and H2 aligned in the sub-scan direction. In a first print area, the magenta ink is printed first in the forward pass. Next, in this first print area the cyan ink is printed in the backward pass. During this backward pass, a second print area is printed with the magenta ink at the same time that the cyan ink is ejected on the first print area.

Next, in the second print area the cyan is printed in the forward pass, during which time the magenta is printed in a third print area. In the first print area, the print time difference between cyan and magenta is large on the left side in the figure with respect to the main scan direction shown by an arrow but gradually decreases toward the right. In the second print area, this is reversed, with the print time difference between cyan and magenta increasing toward the right and gradually decreasing toward the left.

Hence, in the end portions of the print areas, printed areas with large print time differences and printed areas with small print time differences are alternated in the sub-scan direction. The printed area with a larger print time difference has a stronger hue of the first-printed ink. As the print time difference decreases, the hue shifted to the first-printed ink is alleviated. This is explained as follows. When the second ink is ejected after the first ejected ink has soaked into the print medium and well fixed there, the coloring component of the first ejected ink adheres well to the surface or close to the surface of the print medium, so that the intensity of the hue of the first ejected ink, i.e., the density of the first ejected ink, is high.

As the print time difference becomes small, the first landed ink is less fixed when the next ink lands on the medium. In that case, the coloring component of the first ink has not yet adhered well to the surface or close to the surface of the print medium, allowing the color component of the subsequently ejected ink to adhere to the surface or close to it. As a result, the hue is not heavily shifted to the first ejected ink but is neutral with both of the inks almost uniformly mixed, although the hue of the first ink may be slightly stronger. Because of this phenomenon, an image formed has the printed areas of different hues alternated close together, making the hue deviations appear as color deviations.

SUMMARY OF THE INVENTION

The present invention has been accomplished to overcome the above-mentioned problems. It is therefore an object of this invention to provide an ink jet printing apparatus and an ink jet printing method which can realize both a high speed printing and a high quality printing without color deviations when each of the print areas is printed in a plurality of scans by a plurality of print heads ejecting different kinds of ink.

Another object of this invention is to prevent color deviations caused by deviations in the ink ejection time interval between a plurality of print heads in each of the print areas when each print area is printed in a plurality of scans by a plurality of print heads ejecting different kinds of ink to form an image.

To solve the problems described above, the present invention has the following configurations.

A first aspect of this invention provides an ink jet printing apparatus comprising: printing means having a plurality of print heads, each having a plurality of ink ejection nozzles formed therein, the print heads ejecting different kinds of ink to print on a print medium; and print head control means for controlling for each print head independently widths and positions of active nozzle groups in the print heads, the active nozzle groups representing those of the plurality of nozzles in the print heads which are used for printing; wherein the print head control means controls the widths and positions of the active nozzle groups according to a set printing condition.

A second aspect of this invention provides an ink jet printing apparatus comprising: printing means having a plurality of print heads, each having a plurality of ink ejection nozzles formed therein, the print heads ejecting different kinds of ink according to print data associated with the print heads to print on a print medium; print head control means for controlling for each print head independently widths and positions of active nozzle groups in the print heads, the active nozzle groups representing those of the plurality of nozzles in the print heads which are used for printing; and boundary detection means for detecting boundaries between a plurality of print data associated with the print heads; wherein the print head control means controls the widths and positions of the active nozzle groups according to a detection result produced by the boundary detection means.

A third aspect of this invention provides an ink jet printing apparatus comprising: printing means having a plurality of print heads, each having a plurality of ink ejection nozzles formed therein, the print heads ejecting different kinds of ink to print on a print medium; active head portion control means for controlling for each print head independently widths and positions of active head portions in the print heads, the active head portions representing those of the plurality of nozzles in the print heads which are used for printing; and print medium information retrieving means for retrieving information on the print medium; wherein the active head portion control means controls the widths and positions of the active head portions according to the information retrieved by the print medium information retrieving means.

A fourth aspect of this invention provides an ink jet printing method for printing on a print medium by ejecting different kinds of ink from a plurality of print heads, each having a plurality of ink ejection nozzles, the ink jet printing method comprising: a printing condition setting step; a print head control step for controlling for each print head independently widths and positions of active nozzle groups in the print heads according to a set printing condition, the active nozzle groups representing those of the plurality of nozzles in the print heads which are used for printing; and a printing step for printing by the plurality of print heads according to the widths and positions of active nozzle groups set by the print head control step.

A fifth aspect of this invention provides an ink jet printing method for printing on a print medium by ejecting different kinds of ink from a plurality of print heads, each having a plurality of ink ejection nozzles, according to print data associated with the print heads, the ink jet printing method comprising: a boundary detection step for detecting boundaries between the plurality of print data associated with the print heads; a print head control step for controlling for each print head independently widths and positions of active nozzle groups in the print heads according to a detection result produced by the boundary detection step, the active nozzle groups representing those of the plurality of nozzles in the print heads which are used for printing; and a printing step for printing by the plurality of print heads according to the widths and positions of active nozzle groups set by the print head control step.

A sixth aspect of this invention provides an ink jet printing method for printing on a print medium by ejecting different kinds of ink from a plurality of print heads, each having a plurality of ink ejection nozzles, the ink jet printing method comprising: a print medium information retrieving step for retrieving information on the print medium; a print head control step for controlling for each print head independently widths and positions of active nozzle groups in the print heads according to the retrieved information on the print medium, the active nozzle groups representing those of the plurality of nozzles in the print heads which are used for printing; and a printing step for printing by the plurality of print heads according to the widths and positions of active nozzle groups set by the print head control step.

With the above configuration, the optimum widths of the active nozzle groups for the selected print mode can be used for printing. For example, in the high speed printing mode the largest nozzle group widths within the applicable range are specified for printing. In the high quality print mode, limitations are imposed on the use of the active nozzles in printing to prevent image impairments such as color deviations. This arrangement can provide a printing apparatus that can realize both a high speed printing and a high quality printing.

A seventh aspect of this invention provides an ink jet printing apparatus comprising: printing means having a plurality of print heads, each having a plurality of ink ejection nozzles formed therein, the print heads ejecting different kinds of ink to print on a print medium; and print head control means for controlling for each print head independently widths and positions of active nozzle groups in the print heads, the active nozzle groups representing those of the plurality of nozzles in the print heads which are used for printing; wherein the print head control means controls the positions of the active nozzle groups according to a set printing condition.

An eighth aspect of this invention provides an ink jet printing method for printing on a print medium by ejecting different kinds of ink from a plurality of print heads arranged in printing means, each print heads having a plurality of ink ejection nozzles, the ink jet printing method comprising: print head control step for controlling for each print head independently widths and positions of active nozzle groups in the print heads, the active nozzle groups representing those of the plurality of nozzles in the print heads which are used for printing; and wherein the print head control step controls the positions of the active nozzle groups according to a set printing condition.

With the above configuration, the optimum widths of the active nozzle groups for the selected print mode can be used for printing. For example, in the high speed printing mode the largest nozzle group widths within the applicable range are specified for printing. In the high quality print mode, positions of the active nozzle groups that will not cause image impairments, such as color deviations, are specified for printing. This arrangement can provide a printing apparatus that can realize both a high speed printing and a high quality printing.

A ninth aspect of this invention provides an ink jet printing apparatus comprising: printing means having a plurality of print heads, each having a plurality of ink ejection nozzles formed therein, the print heads ejecting different kinds of ink to print on a print medium; and active head portion control means for controlling for each print head independently widths and positions of active head portions in the print heads and print timings of the print heads, the active head portions representing those of the plurality of nozzles in the print heads which are used for printing; wherein the active head portion control means controls a print time interval between the plurality of the print heads in each print area according to a set printing condition.

A tenth aspect of this invention provides an ink jet printing method for printing on a print medium by ejecting different kinds of ink from a plurality of print heads, each having a plurality of ink ejection nozzles, the ink jet printing method comprising: a active head portion control step for controlling for each print head independently widths and positions of active head portions in the print heads and print timings of the print heads, the active head portions representing those of the plurality of nozzles in the print heads which are used for printing; wherein the active head portion control step controls a print time interval between the plurality of the print heads in each print area according to a set printing condition.

With this invention, because the print time interval between the print heads in each print area is controlled according to the set printing condition, it is possible to prevent print time interval deviations in each print area.

For example, in this invention, the widths and positions of the active nozzle groups in the print heads can be limited according to the selected printing condition. Therefore, when a high speed print mode or a high quality print mode is selected as the printing condition, the number of active nozzles and their positions are specified according to the printing condition. This allows either a high speed printing or a high quality printing to be selectively performed as required. Further, since the ink ejection time interval between the print heads in each print area can be controlled, it is possible during the high quality printing to make the ink ejection time interval in each print area constant, thus preventing color deviations in each print area.

The above and other objects, effects, features and advantages of the present invention will become more apparent from the following description of embodiments thereof taken in conjunction with the accompanying drawings.

BRIEF DESCRIPTION OF THE DRAWINGS

FIG. 23 is a table showing times it takes for print areas to be printed by the print heads according to a fifth embodiment of the invention;

DETAILED DESCRIPTION OF PREFERRED EMBODIMENTS

First, an outline configuration of the present invention will be described by taking for example a serial printer which scans a plurality of print heads in the main scan direction.

(1) Outline Configuration 1

In one embodiment of this invention, the width and position of an active portion of each print head (active head portion) are independently set according to printing conditions by obtaining or referencing the printing conditions set in a printer driver or printer body. In a configuration where a plurality of print modes with different print qualities can be set as printing conditions, for example, when a high quality print mode for printing a high quality image is set, the widths and positions of the active nozzles are so set that an idle portion (interval) not used for printing is formed between the active head portions of the print heads in the sub-scan direction. When a high speed print mode for printing an image at high speed is set, the widths of portions of the print heads used for printing (width or span of active nozzles) are set as wide as possible.

Now, the ink jet printing function of this embodiment performed according to the printing conditions will be described. The printing conditions that can be set include the high speed print modes, high quality modes, printing methods and the kinds of print media. Each of these setting conditions will be explained.

High Speed Print Mode

Figure 1A:
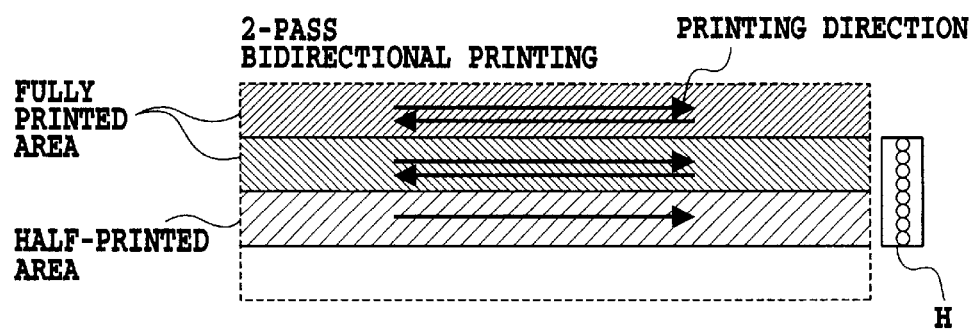
FIG. 1A is an explanatory diagram showing a relationship between the number of scans and print areas in the ink jet printing apparatus when a 2-pass bidirectional printing is performed.
Figure 1B:
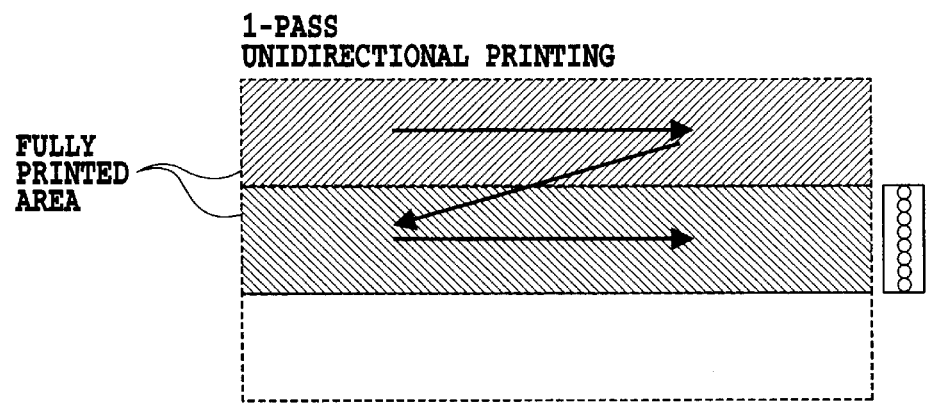
FIG. 1B is an explanatory diagram showing a relationship between the number of scans and print areas in the ink jet printing apparatus when a 1-pass unidirectional printing is performed.
Figure 1C:
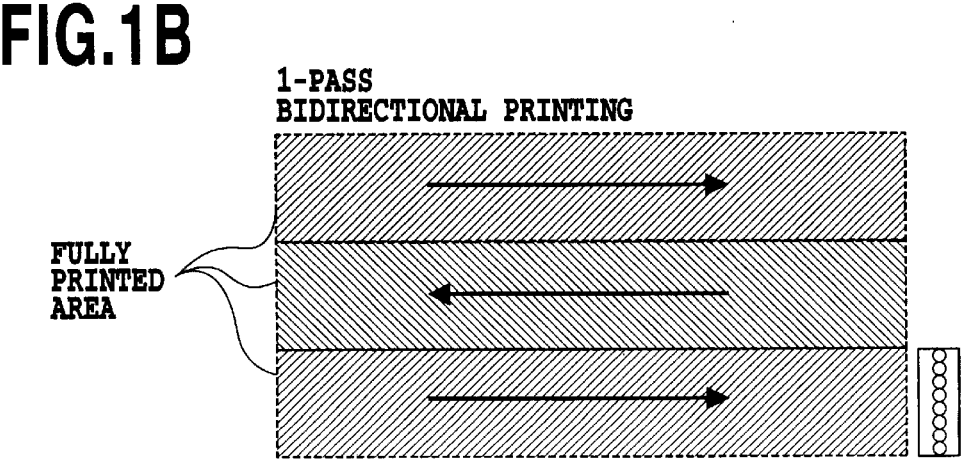
FIG. 1C is an explanatory diagram showing a relationship between the number of scans and print areas in the ink jet printing apparatus when a 1-pass bidirectional printing is performed.
Figure 2A:
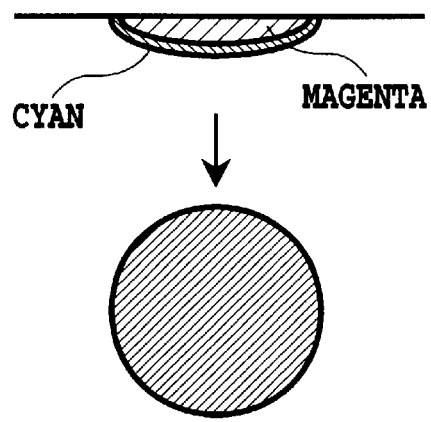
FIGS. 2A and 2B are explanatory diagrams showing how color deviations are caused by a difference in the ink ejection order, as seen in a cross-sectional direction of a print medium.
Figure 2B:
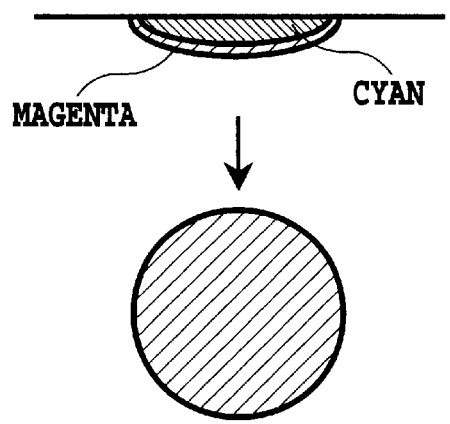
Figure 3:
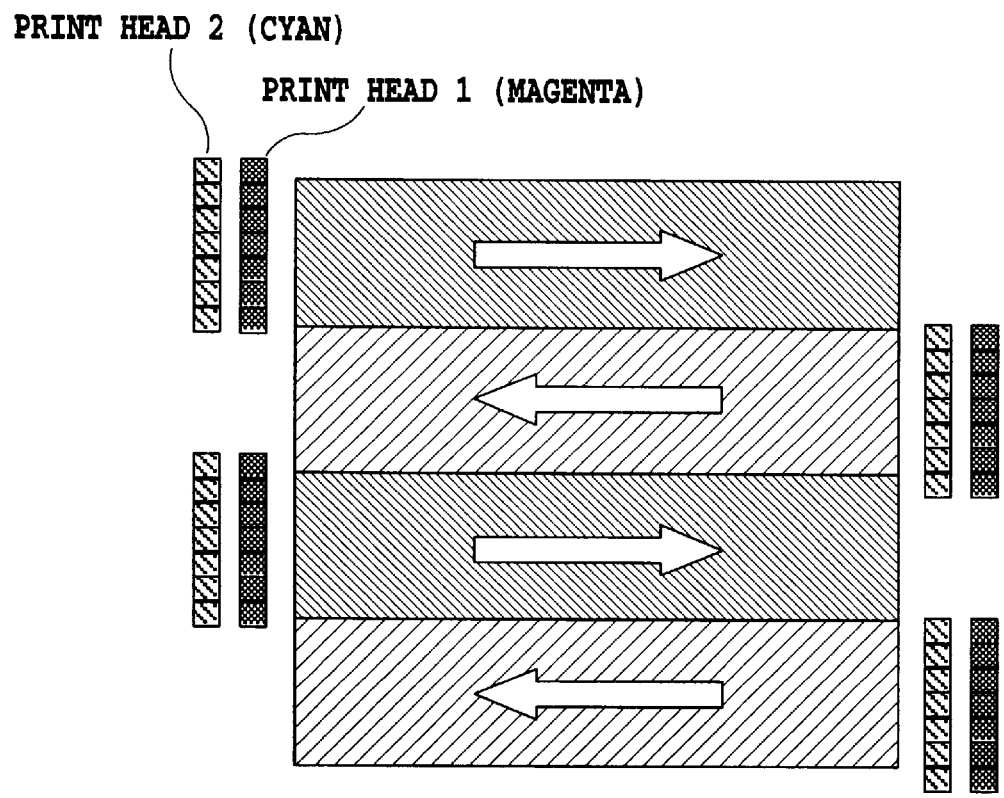
FIG. 3 is an explanatory plan view showing how color deviations are caused by a difference in the ink ejection order in a bidirectional printing.

In this embodiment, when a high speed print mode is set, a 1-pass bidirectional printing shown in FIG. 1C is most effective. As for the width of an active portion of each print head, it is desired that the largest width possible in the system be selected according to the configurations of the printing apparatus and print head.

Figure 5A:
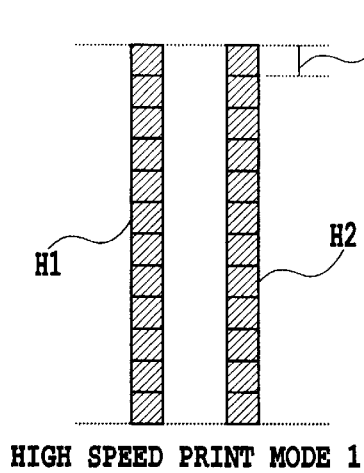
FIG. 5A is an explanatory diagram showing active nozzles in a plurality of print heads in one embodiment of the present invention when the print heads are applied to a high speed print mode 1.
Figure 5B:
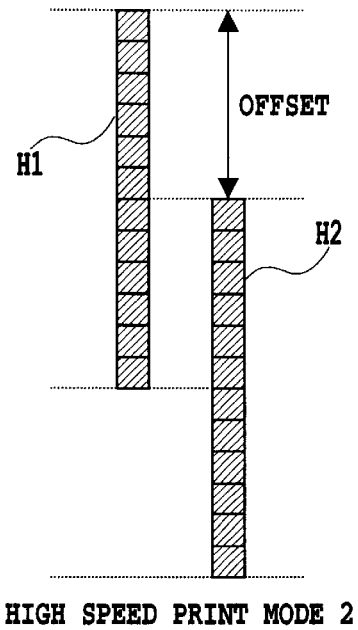
FIG. 5B is an explanatory diagram showing active nozzles in a plurality of print heads in one embodiment of the present invention when the print heads are applied to a high speed print mode 2.

The print heads used in this high speed print mode are shown in FIGS. 5A to 5D. FIG. 5A shows a configuration of a plurality of print heads having a width of 384 nozzles each. In this configuration, a first print head H1 and a second print head H2 are arranged parallel. In FIG. 5A each square in the print head represents a block of 32 nozzles. FIG. 5B shows a configuration in which a plurality of print heads (first print head H1 and second print head H2) each 384 nozzles wide are offset from each other by 192 nozzles. In the case of FIGS. 5A and 5B, both of the print heads are set to use their full widths, i.e., all their nozzles, as active nozzles.

Figure 5C:
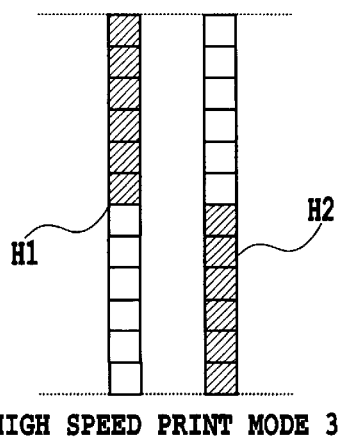
FIG. 5C is an explanatory diagram showing active nozzles in a plurality of print heads in one embodiment of the present invention when the print heads are applied to a high speed print mode 3.

Print heads shown in FIG. 5C, though arranged similar to FIG. 5A in head configuration, are divided into active nozzles and idle nozzles to meet various needs for dividing the scan among a plurality of print heads and for limiting the number of nozzles that can be driven simultaneously for reduced power consumption. In FIG. 5C, the hatched blocks in each print head represent active nozzles used for printing. Here, the first print head H1 uses only the upper 192 nozzles and the second print head H2 uses only the lower 192 nozzles. These print heads H1, H2 are inhibited from simultaneously printing on one and the same print area during the same scan and each print area is printed by a plurality of scans.

Figure 5D:
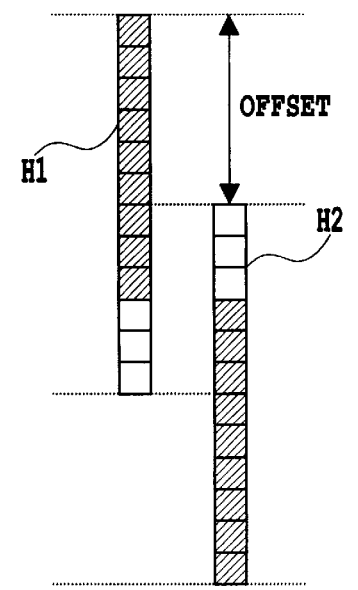
FIG. 5D is an explanatory diagram showing active nozzles in a plurality of print heads in one embodiment of the present invention when the print heads are applied to a high speed print mode 4.

Similarly, print heads shown in FIG. 5D, though arranged similar to FIG. 5B in head configuration, are divided into active nozzles and idle nozzles for the reasons described above. As in FIG. 5C, the hatched blocks in each print head represent active nozzles used for printing. In this case, the first print head H1 uses only the upper 288 nozzles and the second print head H2 uses only the lower 288 nozzles. Limiting the use of the active nozzles in this way is intended to ensure that the print heads H1, H2 do not print simultaneously on one and the same print area during the same scan. Therefore, a simultaneous printing by the print heads H1, H2 on one and the same print area is inhibited.

The reason for inhibiting a plurality of print heads from simultaneously printing on one and the same print area during the same scan is to prevent a problem such as ink spread at a boundary due to the characteristics of inks used.

As described above, in the high speed print mode an image can be formed at the highest speed by selecting the maximum width of the active head portion (maximum number of active nozzles) that can be applied according to the condition of use of the ink jet printing apparatus or the print head configuration and performing a 1-pass bidirectional printing.

Because the high speed print mode puts emphasis on speed, it is also possible to thin out the print data to increase a drive frequency of the print head and to alleviate the limit on the number of active nozzles that is imposed for reducing power consumption.

High Quality Print Mode

Next, in this embodiment one example case of realizing the high quality printing will be explained. Here, to retain the high speed printing performance, the 1-pass bidirectional printing of FIG. 1C is performed while at the same time enabling a high quality printing.

The problem experienced when performing the high-speed printing by using the 1-pass bidirectional printing is an image quality deterioration described above. In this embodiment, the print heads as shown in FIGS. 6A and 6B are used to perform the print operation as shown in FIG. 7 to overcome the above-mentioned problem.

Figure 6A:
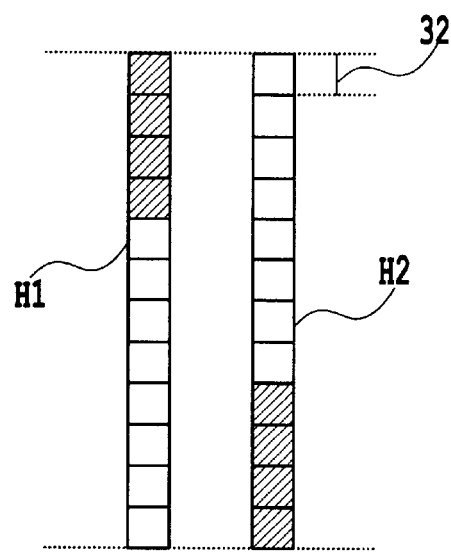
FIG. 6A is an explanatory diagram showing active nozzles in a plurality of print heads in one embodiment of the present invention when the active nozzles are applied to a high quality print mode 1.
Figure 7:
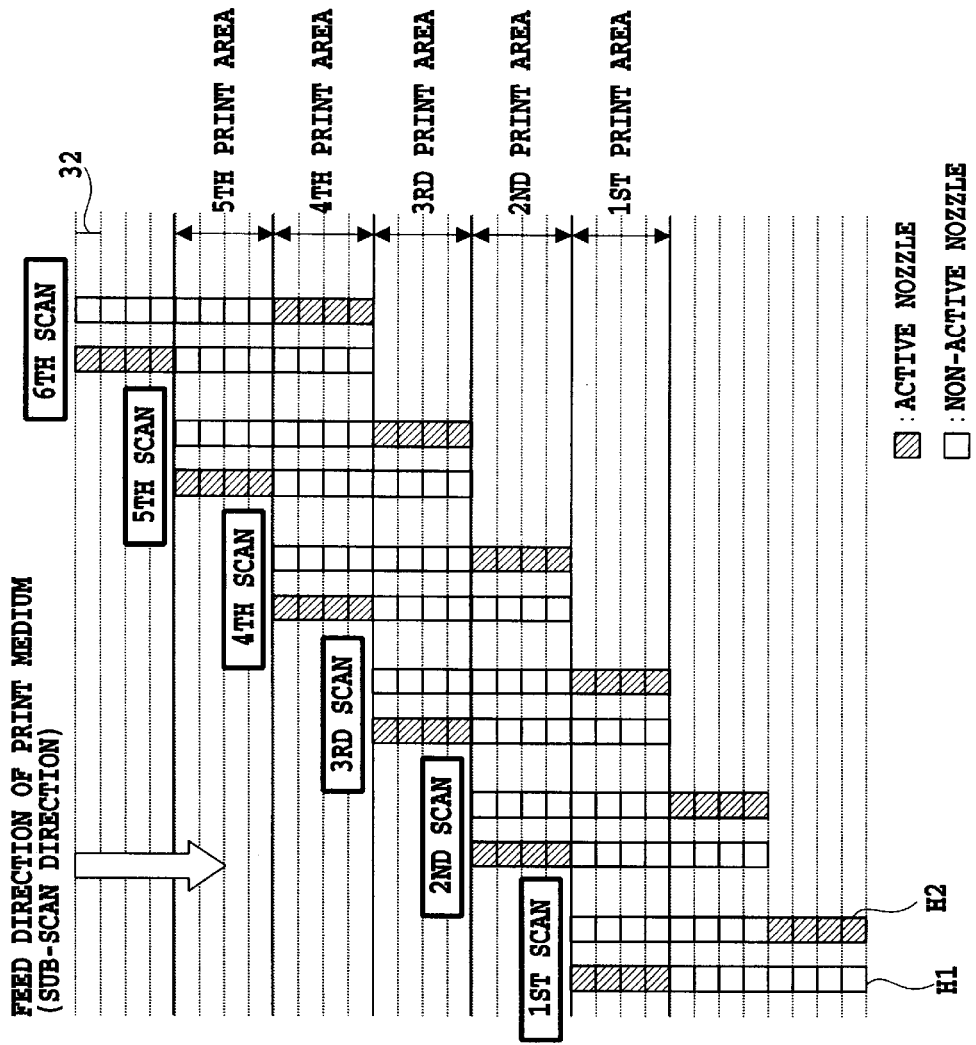
FIG. 7 is an explanatory diagram showing a printing process when a plurality of print heads according to one embodiment of this invention execute the high quality print mode 1.

FIG. 6A shows a configuration in which a plurality of print heads each 384 nozzles wide (first print head H1 and second print head H2) are arranged parallel. As in FIGS. 5A to 5D, the squares shown in the print heads each represent a block of 32 nozzles. In the configuration of FIG. 6A, the active nozzles (active head portion) in the first print head H1 are only upper 128 nozzles. The active nozzles (active head portion) in the second print head H2 are only lower 128 nozzles.

Figure 6B:
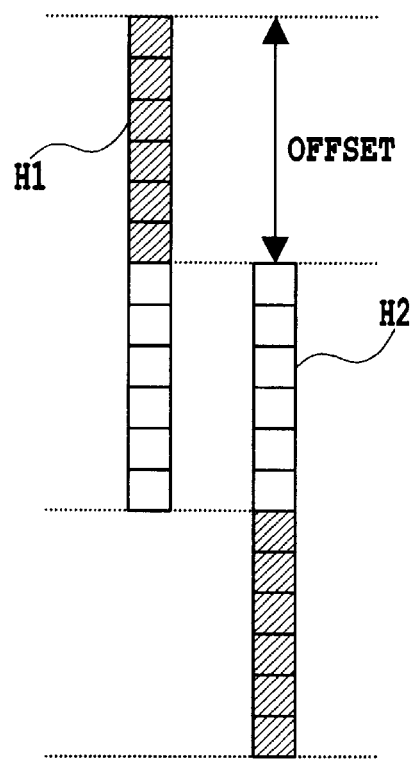
FIG. 6B is an explanatory diagram showing active nozzles in a plurality of print heads in one embodiment of the present invention when the active nozzles are applied to a high quality print mode 2.

FIG. 6B shows a configuration in which a first print head H1 and a second print head H2, each 384 nozzles wide, are arranged offset by 192 nozzles, as in FIG. 5B. In the configuration of FIG. 6B the active nozzles (active head portion) in the first print head H1 are only upper 192 nozzles. The active nozzles (active head portion) in the second print head H2 are only lower 192 nozzles.

The operation to perform printing on a print medium by using the head configuration shown in FIGS. 6A and 6B will be described by referring to FIG. 7 and FIG. 8. FIG. 7 shows the printing process in which the 1-pass bidirectional printing is performed by using the print heads of FIG. 6A. The print medium is fed downward (sub-scan) as shown by an arrow in the figure, and the print heads are reciprocally moved (main scan) in a direction perpendicular to the sub-scan direction.

In a first scan, the first print head H1 and the second print head H2 are scanned in a forward direction to perform printing. In a second scan, these print heads are scanned in a backward direction to perform printing. In third and subsequent scans, the print heads are moved in the forward direction during the odd-numbered scans and in the backward direction during the even-numbered scans, thus proceeding to complete an image by the 1-pass bidirectional printing.

That is, in the first scan the first print head H1 prints on the first print area. In the second scan the first print head H1 prints on the second print area. Next, in the third scan the first print head H1 prints on the third print area and at the same time the second print head H2 prints on the first print area. Next, in the fourth scan, the first print head H1 prints on the fourth print area and at the same time the second print head H2 prints on the second print area. Next, in the fifth scan, the first print head H1 prints on the fifth print area and at the same time the second print head H2 prints on the third print area. In this way, the first print head H1 and the second print head H2 print on respective print areas successively.

As described above, FIG. 6B shows a configuration in which a plurality of print heads each 384 nozzles wide (first print head H1 and second print head H2) are arranged offset by 192 nozzles. The process of executing a 1-pass bidirectional printing using the head configuration of FIG. 6B will be explained by referring to FIG. 8.

Figure 8:
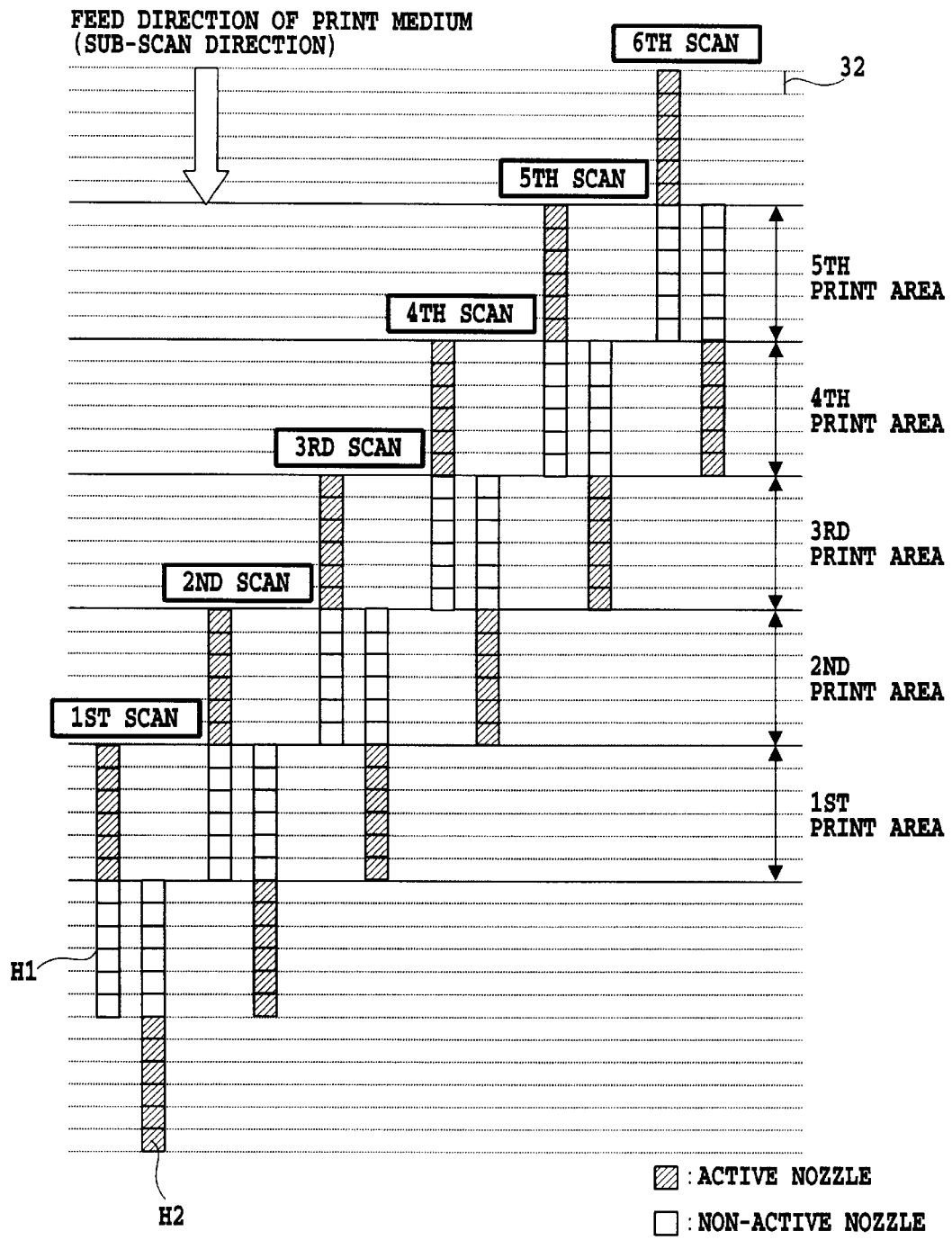
FIG. 8 is an explanatory diagram showing a printing process when a plurality of print heads according to one embodiment of this invention execute the high quality print mode 2.

In FIG. 8, the printing procedure is similar to that shown in FIG. 7. The only difference is that there is a 192-nozzle offset between the first print head H1 and the second print head H2 and that since the print areas are wider in the sub-scan direction than those of FIG. 7 by about 1.5 times, this configuration is more advantageous for high-speed printing to that extent. As for the construction of the printing apparatus, because the overall width of the active nozzles is increased, the print heads become larger, which is somewhat disadvantageous in terms of reducing the size of the apparatus.

A notable feature of the printing operation in the high quality print mode shown in FIG. 7 and FIG. 8 is a relationship between the printing by the first print head H1 and the printing by the second print head H2 on one and the same print area. That is, the first print area is printed by the first scan and the third scan in the forward direction. During the second scan performed in the return direction between the first and third scans, the printing is performed on the second print area. The second print area is printed by the second and fourth scans in the backward direction. During the third scan performed in the forward direction between the second and fourth scans, the printing is done on the first print area as described above. Then, the third, fourth and subsequent print areas are successively printed in the similar manner.

In this high quality printing operation, when we look at a particular print area, one idle scan that does not perform printing is inserted between a plurality of scans of the print heads. This idle scan, though it does not perform printing on that particular print area, performs printing on other print areas.

Therefore, the printing by the first print head H1 and the printing by the second print head H2 are performed at a fixed time interval in all of the print areas under consideration. In other words, although the printing direction is reversed every print area, a plurality of print heads print on one and the same print area with a fixed time difference. Further, in the adjoining print areas, these print heads perform printing with the same time differences.

Although this embodiment has a configuration such that the ink ejection time interval remains the same in each of print areas, no practical problem arises if there are print areas whose time intervals vary within a range of a few rasters. That is, if the print areas have dimensional deviations less than a level that the user recognizes as an image impairment, the resulting deviations in time interval and color deviations do not pose a serious problem in terms of image quality.

As described above, in a plurality of print heads, by limiting the widths and positions of active print head portions, it is possible to keep the ink ejection time difference constant in each print area and also keep the ink ejection time differences equal among different print areas, thereby producing a high quality printed image without color deviations.

(2) Outline Configuration 2

In another embodiment of this invention, the positions and widths of the active nozzle groups in a plurality of print heads are set for each print head independently according to the printing conditions by obtaining or referring to the printing conditions set in a printer driver or printer body. For example, in a configuration that allows a plurality of print modes representing different image qualities to be specified, when a high quality print mode for printing a high quality image is set, the widths and positions of active nozzle groups are set in such a way that a portion not used for printing (idle space) is formed in the sub-scan direction between the active head portions of the print heads. When a high speed print mode for printing an image at high speed is set, the interval between the active head portions is set relatively short so that the portion not used for printing (idle space) is not formed in the sub-scan direction.

Here, the ink jet printing function of this embodiment performed according to the printing conditions will be explained. The printing conditions that can be set include the high speed print mode, the high quality print mode and others. Each of these print modes will be explained as follows.

High Speed Print Mode

In this embodiment, when the high speed print mode is set, the execution of the 1-pass bidirectional printing shown in FIG. 1C is not effective. As for the widths of active nozzle groups in the print heads, it is desired that the maximum width available in the system be selected according to the configuration of the printing apparatus and the print head.

Figure 9A:
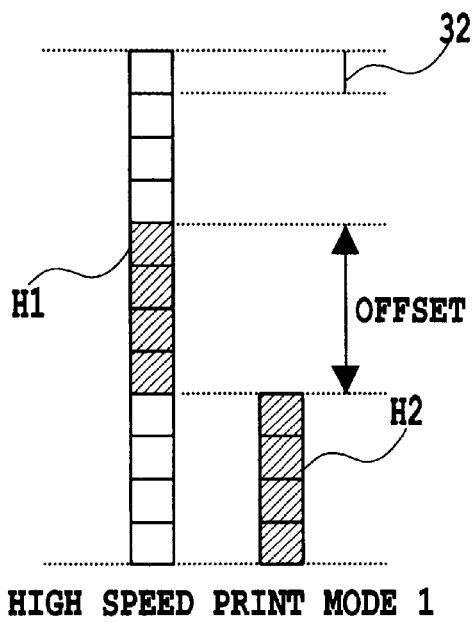
FIG. 9A is an explanatory diagram showing the positions of active nozzles in a plurality of print heads according to one embodiment of the invention when the print heads are applied to the high speed print mode 1.
Figure 9B:
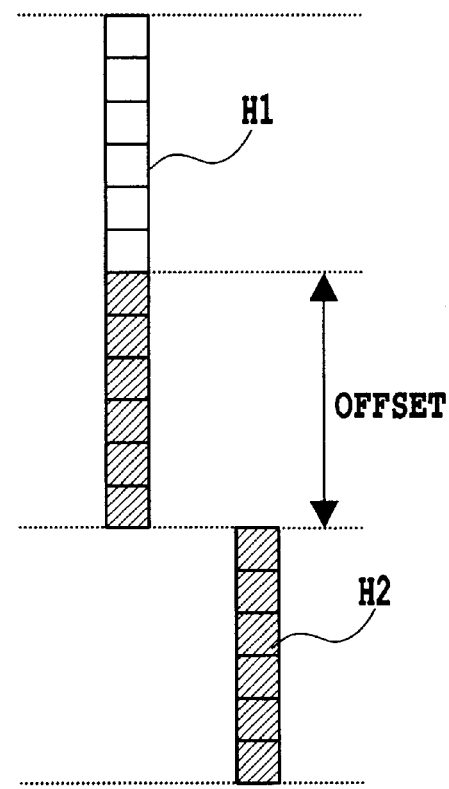
FIG. 9B is an explanatory diagram showing the positions of active nozzles in a plurality of print heads according to one embodiment of the invention when the print heads are applied to the high speed print mode 2.

The configurations of the print heads used in this high speed print mode are shown in FIGS. 9A and 9B.

FIG. 9A shows a configuration in which a print head H1 384 nozzles wide and a print head H2 128 nozzles wide are arranged parallel to each other. FIG. 9B shows another configuration in which a print head 384 nozzles wide and a print head H2 192 nozzles wide are arranged parallel and offset by 192 nozzles.

In these head configurations, the amount of the offset between the active nozzle groups corresponds to the amount of sub-scan of one pass, and the feed distance in the sub-scan direction is determined by the length of the print head H2.

Further, these two print heads are inhibited from simultaneously printing on one and the same print area during the same scan. This is to prevent problems that may arise from characteristics of inks used, such as an ink spread at a boundary between different inks. The phenomenon of an ink spread at boundary will be detailed later.

The process of printing on a print medium by using these print heads will be described below.

Figure 10:
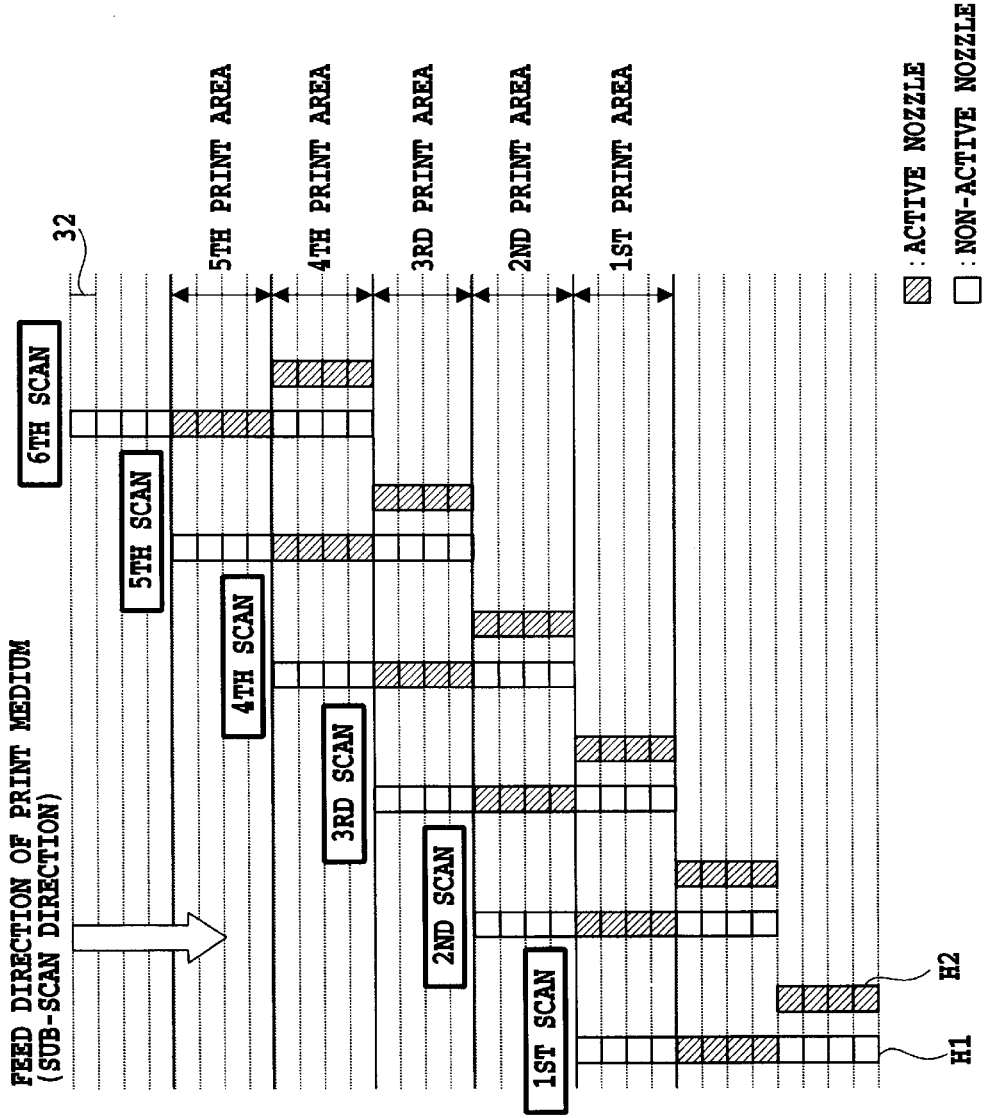
FIG. 10 is an explanatory diagram showing a printing process when a 1-pass bidirectional printing is performed by using the print heads of FIG. 9A.

FIG. 10 shows a process of 1-pass bidirectional printing using the print heads of FIG. 9A. It is assumed that the print medium is fed downward (sub-scan) as indicated by an arrow in the figure and the print heads are reciprocally moved (main scan) in a direction perpendicular to the sub-scan direction.

In FIG. 10, in a first scan the first print head H1 and second print head H2 are scanned in the forward direction for printing. In a second scan these print heads are scanned in the backward direction. In third and subsequent scans, the print heads are moved in the forward direction during the odd-numbered scans and in the backward direction during the even-numbered scans, thus proceeding to complete an image by the 1-pass bidirectional printing.

That is, in the first scan, the first print head H1 prints on a first print area. In the second scan the first print head H1 prints on a second print area while at the same time the second print head H2 prints on the first print area. Next, during the third scan the first print head H1 prints on a third print area while at the same time the second print head H2 prints on the second print area. Next, in a fourth scan the first print head H1 prints on a fourth print area while at the same time the second print head H2 prints on the third print area. Next, during a fifth scan the first print head H1 prints on a fifth print area while at the same time the second print head H2 prints on the fourth print area. In this way, a series of print areas are successively printed by the first print head H1 and the second print head H2.

A notable feature of the high speed print mode shown in FIGS. 9A, 9B and FIG. 10 is a relationship between the printing by the first print head H1 and the printing by the second print head H2 on one and the same print area. That is, the first print area is printed by the first scan in the forward direction and then by the second scan in the backward direction. The second print area is printed by the second scan in the backward direction and then by the third scan in the forward direction. This is followed by the printing of the third print area, fourth print area and so on in the similar procedure.

As described above, in the high speed print mode, an image can be formed at the fastest speed by selecting the maximum widths of the active head portions (maximum numbers of active nozzles) conforming to the use condition of the ink jet printing apparatus or the configurations of the print heads and performing the 1-pass bidirectional printing.

Because the high speed print mode puts emphasis on speed, it is also possible to thin out the print data to increase a drive frequency of the print head and to alleviate the limit on the number of active nozzles that is imposed for reducing power consumption.

High Quality Print Mode

Next, in this embodiment one example case of realizing the high quality printing will be explained. Here, to retain the high speed printing performance, the 1-pass bidirectional printing of FIG. 1C is performed while at the same time enabling a high quality printing.

The problem encountered when performing the high-speed printing by using the 1-pass bidirectional printing is an image quality deterioration described above. In this embodiment, to overcome the above-mentioned problem the print heads as shown in FIG. 11A are used to perform the print operation as shown in FIG. 12.

Figures 11A, 11B:
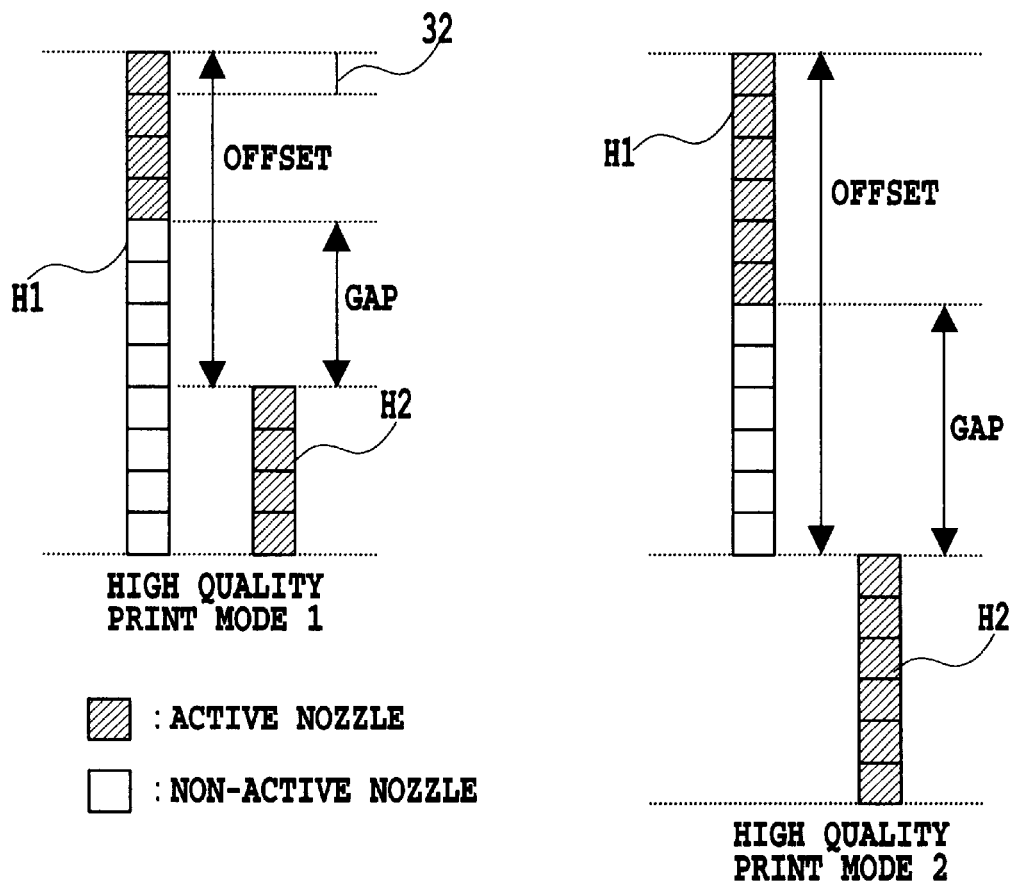
FIG. 11A is an explanatory diagram showing the positions of active nozzles in a plurality of print heads according to one embodiment of the invention when the print heads are applied to the high quality print mode 1.
FIG. 11B is an explanatory diagram showing the positions of active nozzles in a plurality of print heads according to one embodiment of the invention when the print heads are applied to the high quality print mode 2.
Figure 12:
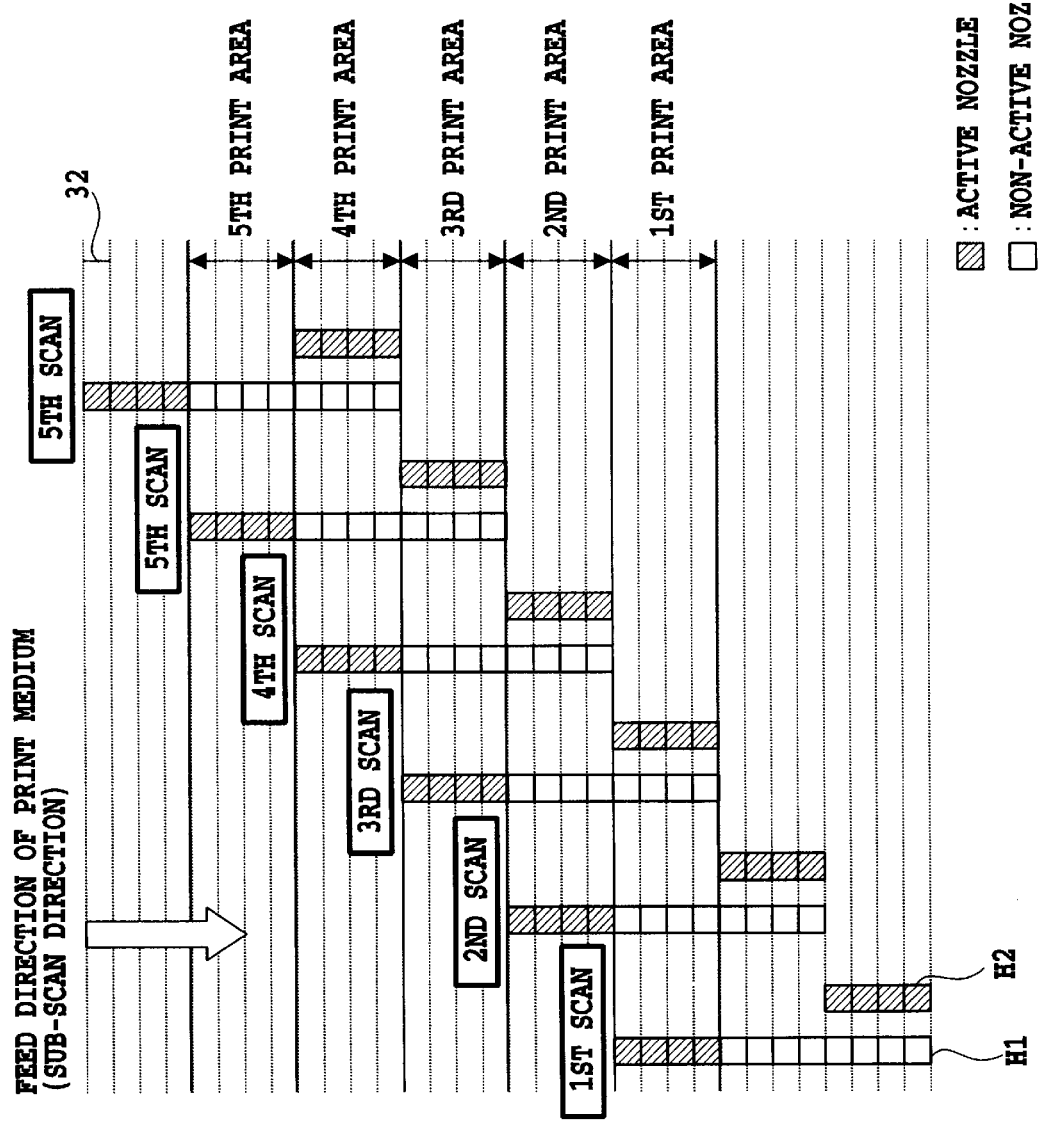
FIG. 12 is an explanatory diagram showing a printing process when a high quality print mode 1 is performed by using the print heads of FIG. 11A.

FIG. 11A shows a configuration in which a plurality of print heads (a first print head H1 384 nozzles wide and a second print head H2 128 nozzles wide) are arranged parallel. The active nozzles in the first print head H1 are only upper 128 nozzles. The active nozzles in the second print head H2 are all 128 nozzles.

FIG. 11B shows a configuration in which a first print head H1 384 nozzles wide and a second print head H2 192 nozzles wide are arranged offset by 192 nozzles. The active nozzles in the first print head H1 are only upper 192 nozzles. The active nozzles in the second print head H2 used for printing are all 192 nozzles.

The operation to perform printing on a print medium by these print heads will be described. FIG. 12 shows the printing process in which the 1-pass bidirectional printing is performed by using the print heads of FIG. 11A. The print medium is fed downward (sub-scan) as shown by an arrow in the figure, and the print heads are reciprocally moved (main scan) in a direction perpendicular to the sub-scan direction.

In a first scan, the first print head H1 and the second print head H2 are scanned in a forward direction to perform printing. In a second scan, these print heads are scanned in a backward direction to perform printing. In third and subsequent scans, the print heads are moved in the forward direction during the odd-numbered scans and in the backward direction during the even-numbered scans, thus proceeding to complete an image by the 1-pass bidirectional printing.

That is, in the first scan the first print head H1 prints on the first print area. In the second scan the first print head H1 prints on the second print area. Next, in the third scan the first print head H1 prints on the third print area and at the same time the second print head H2 prints on the first print area. Next, in the fourth scan, the first print head H1 prints on the fourth print area and at the same time the second print head H2 prints on the second print area. Next, in the fifth scan, the first print head H1 prints on the fifth print area and at the same time the second print head H2 prints on the third print area. In this way, the first print head H1 and the second print head H2 print on respective print areas successively.

FIG. 11B shows a configuration in which a first print head H1 384 nozzles wide and a second print head H2 192 nozzles wide are arranged offset by 192 nozzles.

The process of printing by using the head configuration of FIG. 11B is similar to that shown in FIG. 12, except for the following points. That is, because there is a 192-nozzle offset between the first print head H1 and the second print head H2 and their print widths are 1.5 times larger in the sub-scan direction than those of the heads of FIG. 11A, the head configuration of FIG. 11B is more advantageous for the high speed printing to that extent. This configuration, however, increases the overall width of active nozzles and therefore the print head size, which is somewhat disadvantageous in terms of reducing the size of the printing apparatus.

A notable feature of the high quality print mode shown in FIGS. 11A, 11B and FIG. 12 is a relationship between the printing by the first print head H1 and the printing by the second print head H2 on one and the same print area. That is, the first print area is printed by the first scan and the third scan in the forward direction. During the second scan performed in the backward direction between the first and third scans, the printing is performed on the second print area. The second print area is printed by the second and fourth scans in the backward direction. During the third scan performed in the forward direction between the second and fourth scans, the printing is done on the first print area as described above. Then, the third, fourth and subsequent print areas are successively printed in the similar manner.

In this high quality printing operation, when we look at a particular print area, one idle scan that does not perform printing is inserted between a plurality of scans of the print heads. This idle scan, though it does not perform printing on that particular print area, performs printing on other print areas.

Therefore, the printing by the first print head H1 and the printing by the second print head H2 are performed at a fixed time interval in all of the print areas under consideration. In other words, although the printing direction is reversed every print area, a plurality of print heads print on one and the same print area with a fixed time difference. Further, in the adjoining print areas, these print heads perform printing with the same time differences.

Although this embodiment has a configuration such that the ink ejection time interval remains the same in each of print areas, no practical problem arises if there are print areas whose time intervals vary within a range of a few rasters. That is, if the print areas have dimensional deviations less than a level that the user recognizes as an image impairment, the resulting deviations in time interval and color deviations do not pose a serious problem in terms of image quality.

As described above, in a plurality of print heads, by limiting the widths and positions of active print head portions, it is possible to keep the ink ejection time difference constant in each print area and also keep the ink ejection time differences equal among different print areas, thereby producing a high quality printed image without color deviations.

What should be noted here is the number of scans required to complete the printing on one print area. Let us compare the high speed print mode of FIG. 10 and the high quality print mode of FIG. 12 by assuming that their print medium feeds are equal. The number of scans taken by the high speed print mode to complete the printing on the first to fourth print areas is five scans, from first to fifth scan, whereas the high quality print mode requires six scans, from first to sixth scan. This is because in the high quality print mode there is an idle space equal in the sub-scan direction to one scan between the active head portions of the first print head H1 and second print head H2.

By offsetting the positions of the active nozzle groups in the both print heads in the sub-scan direction, a high quality printing without color deviation can be performed while suppressing image impairments due to ink ejection time difference. In the high speed print mode, since there is no idle space between the active head portions of the first print head H1 and second print head H2 in the sub-scan direction, the printing can be done with a relatively smaller number of printing operations compared with that of the high quality print mode and thus a faster printing can be made.

The difference in the number of scans required to complete the printing results from the fact that the active nozzle groups in the two print heads are shifted by one scan width in the sub-scan direction. When the positions of the active nozzle groups are shifted between the high quality print mode and the high speed print mode, the amount of shift is preferably one scan width in the sub-scan direction.

Further, while the high speed print mode has a possibility of inducing image impairments that are overcome by the high quality print mode, it is possible to make these problems less likely by performing a thinning out operation. While the high quality print mode cannot use the thinning out operation as it may cause image deterioration, the high speed print mode that puts emphasis on high speed can employ a thinning out of about 50% to realize a satisfactory high speed printing without causing a significant reduction in the reflection density. This method can suppress an image impairment by limiting the amount of ink used.

According to the embodiment described above, optimum positions of active nozzle groups can be set according to the print mode selected. That is, in the high speed print mode the printing is performed by specifying the active nozzle group positions within an applicable range that are most suited for the high speed printing. In the high quality print mode, the number of active nozzles are limited not to cause image impairments, such as color deviations. In this way, a high speed printing and a high quality printing can be executed in one printing apparatus.

(3) Other Configurations

Multipass Print Mode

In the embodiment described above, the print head configurations as shown in FIGS. 5A to 5D, FIGS. 6A and 6B may be used to perform a multipass printing. The multipass printing, as is known, is suited for high quality printing. The print quality of the multipass printing can further be improved by adopting the high quality print mode of FIGS. 7 and 8 setting the active nozzles in the print heads as shown in FIGS. 6A and 6B.

The printing speed, which is lost in the multipass printing, may be improved by selecting the high speed print mode and setting the active nozzles as shown in FIGS. 5A to 5D.

Ink Spread at Boundary between Different Colors

In the conventional ink jet printing method as described above, the print quality on "plain paper" is not yet satisfactory. The most contributing factor for this problem is the difficulty in preventing ink spread at a boundary between different colors while at the same time maintaining a print quality of black (especially maintaining a black character print quality).

Normally, when a color image is to be printed on a sheet of plain paper according to an ink jet printing method, quick-dry inks that soak into paper quickly are used. Hence, while the inks at boundaries between different colors produce a high quality image, an overall density of the image is low and a so-called feathering, a phenomenon in which inks slightly spread along paper fibers, easily develops around the printed image of each color.

The feathering does not show conspicuously in a color image area but is easily noticeable in a black image area, degrading the print quality. When a black image is characters, in particular, the feathering makes the characters look unclear with less sharpness, resulting in a significantly degraded quality. To produce a black printed image of high density and quality with reduced feathering, it is necessary to use a black ink that soaks into plain paper relatively quickly.

One example of components of inks used in this embodiment is shown below.

1. Y (yellow)
    - C.I. Direct Yellow 86         3 parts
    - Diethylene glycol              10 parts
    - Isopropyl alcohol              2 parts
    - Urea                           5 parts
    - Acetylenol EH (KawaKen Fine Chemical)   1 part
    - Water                          Remaining
2. M (magenta)
    - C.I. Acid Red 289              3 parts
    - Diethylene glycol              10 parts
    - Isopropyl alcohol              2 parts
    - Urea                           5 parts
    - Acetylenol EH (KawaKen Fine Chemical)   1 part
    - Water                          Remaining
3. C (cyan)
    - C.I. Direct Blue 199           3 parts
    - Diethylene glycol              10 parts
    - Isopropyl alcohol              2 parts
    - Urea                           5 parts
    - Acetylenol EH (KawaKen Fine Chemical)   1 part
    - Water                          Remaining
4. Bk (black)
    - C.I. Direct Black 154          3 parts
    - Diethylene glycol              10 parts
    - Isopropyl alcohol              2 parts
    - Urea                           5 parts
    - Water                          Remaining As listed above, the soaking ability of CMY colors is improved by adding 1% of acetylenol EH. Other additives include surfactants and alcohols. Since the soaking ability enhancing component is not added to the Bk ink, its soaking rate is relatively slow, realizing an excellent character quality. In the above example, dyes are used as coloring materials. Pigments may be used instead. For the improvement of character quality, it is considered preferable to use the pigments.

In this case, however, color inks spread at boundaries between a black image area and color image areas, degrading the image quality significantly. Further, the black is affected by the soaking ability enhancing components of the color inks, so that the distribution of the black coloring material becomes uneven at the boundaries, causing the image to appear lighter. This is called a "white haze" phenomenon which, like a spread at boundaries, is recognized as one of image impairments.

To deal with this problem, a method has been proposed which performs a multipass printing—which completes the image printing in two or more scans—in areas along boundaries between black and colors to provide a sufficient time interval between ink ejections to allow the previously printed ink to be fixed well, thereby preventing ink spreads at boundaries between black and colors. This method, however, has a problem that because a plurality of scans are performed on each print area, a larger amount of time is necessary than is required by the normal printing (1-pass printing) that completes the printing in one scan.

In this embodiment, a 1-pass bidirectional printing, the fastest configuration of the printing apparatus, is executed in each print area with the successive ejections of different inks performed at sufficient time intervals so that the previously printed ink is fixed well. That is, as described in connection with the 1-pass high quality print mode, in the printing performed by a plurality of print heads an idle scan that does not print is inserted in order to provide an ink fixing time, thus securing the same effect as the multipass printing.

As described above, with this embodiment of the invention, it is possible to set the widths of the active nozzle groups (numbers of active nozzles) and their positions in optimum states according to the print mode selected. That is, in the high speed print mode the printing is performed by specifying the largest widths of the active nozzle groups (maximum numbers of active nozzle groups) within an applicable range that are most suited for the high speed printing. In the high quality print mode, the widths of the active nozzle groups are limited not to cause image impairments, such as color deviations. In this way, a high speed printing and a high quality printing can be obtained in one printing apparatus.

Now, the embodiments of the present invention will be described in more detail by referring to the accompanying drawings. Throughout the drawings, those portions denoted with like reference numerals are identical or corresponding portions.

First Embodiment

A first embodiment of the invention relates to a printing method which performs printing on a print medium by using a plurality of print heads and inks to form an image. This method selects appropriate active nozzle groups (active head portions) according to information on the print mode, i.e., whether a high speed print mode or a high quality print mode is set.

Configuration of Printing Apparatus

Figure 13:
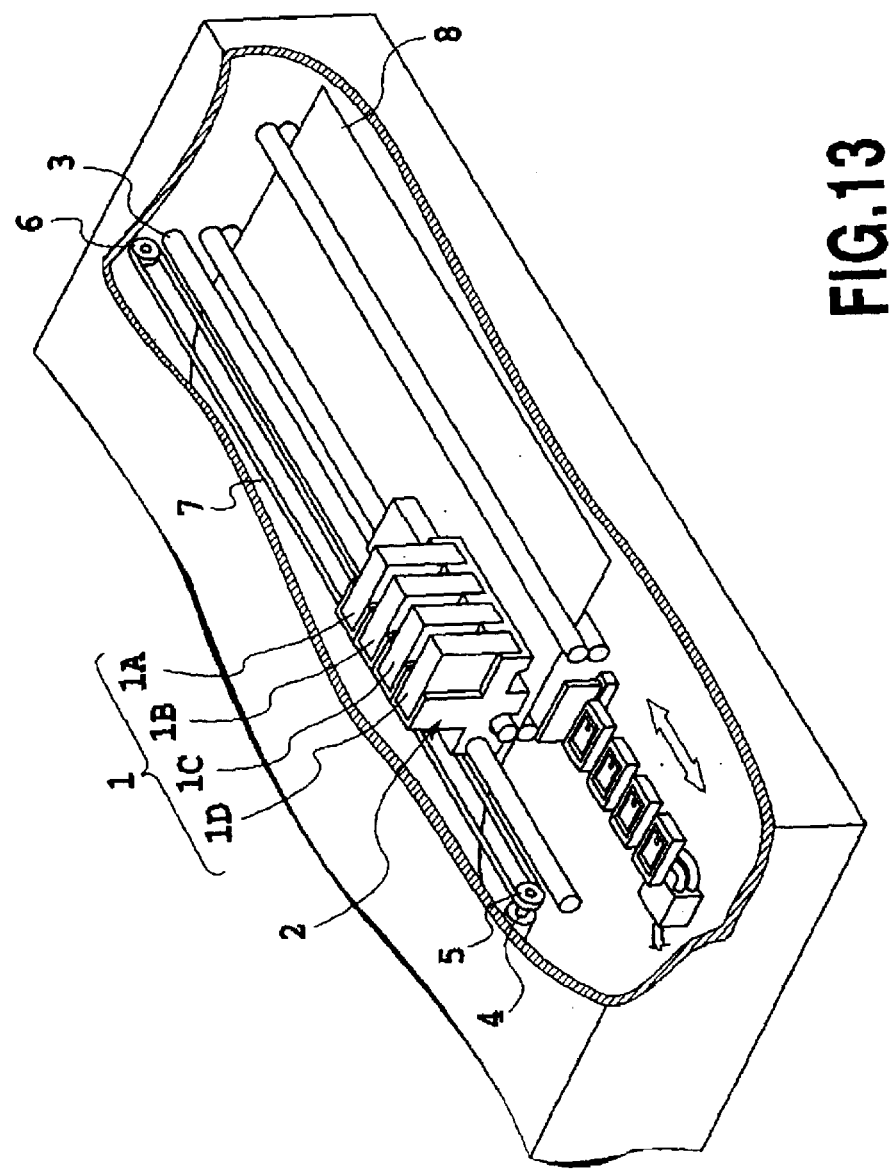
FIG. 13 is a partly cutaway perspective view showing an outline construction of the ink jet printing apparatus according to embodiments of this invention.

FIG. 13 is a perspective view schematically showing an essential-part configuration of the embodiment of the ink jet printing apparatus applying the present invention. In FIG. 13, a plurality (four) of cartridges 1A, 1B, 1C, 1D are removably mounted on a carriage 2. Each of the cartridges 1A–1D is provided with a connector for receiving a signal for driving the print head. In the following description the entire or any one of the printing means 1A–1D is denoted simply by a printing means (print head or head cartridge) 1.

The cartridges 1 print by using inks of different colors, such as cyan, magenta, yellow and black, which are contained in their tanks. Each of the printing means 1 is positioned and removably mounted on the carriage 2, which has a connector holder (electric connecting portion) for transferring drive signals and others to the printing means 1 through the connector.

The carriage 2 is movably supported along a guide shaft 3 extending in the main scan direction in the printing apparatus body. The carriage 2 is driven by a main scan motor 4 through a motor pulley 5, a follower pulley 6 and a timing belt 7 and thereby controlled in its position and movement. A print medium 8 such as paper and plastic thin sheet is fed through an area (printing portion) facing a nozzle face of the first print head H1 by the rotation of two sets of feed rollers. The print medium is supported at its back on a platen (not shown) to form a flat printing surface in the printing portion. Each cartridge 1 mounted on the carriage 2 has its nozzle surface protruding down from the carriage 2 to be parallel to the print medium 8 between the two sets of the feed rollers.

The first print head H1 is an ink jet printing means that uses thermal energy to eject an ink and has electrothermal transducers to generate the thermal energy. To perform printing, the first print head H1 ejects the ink from the nozzles by utilizing a pressure change caused by growth and contraction of bubbles produced by film boiling due to thermal energy applied from the electrothermal transducers.

Figure 14:
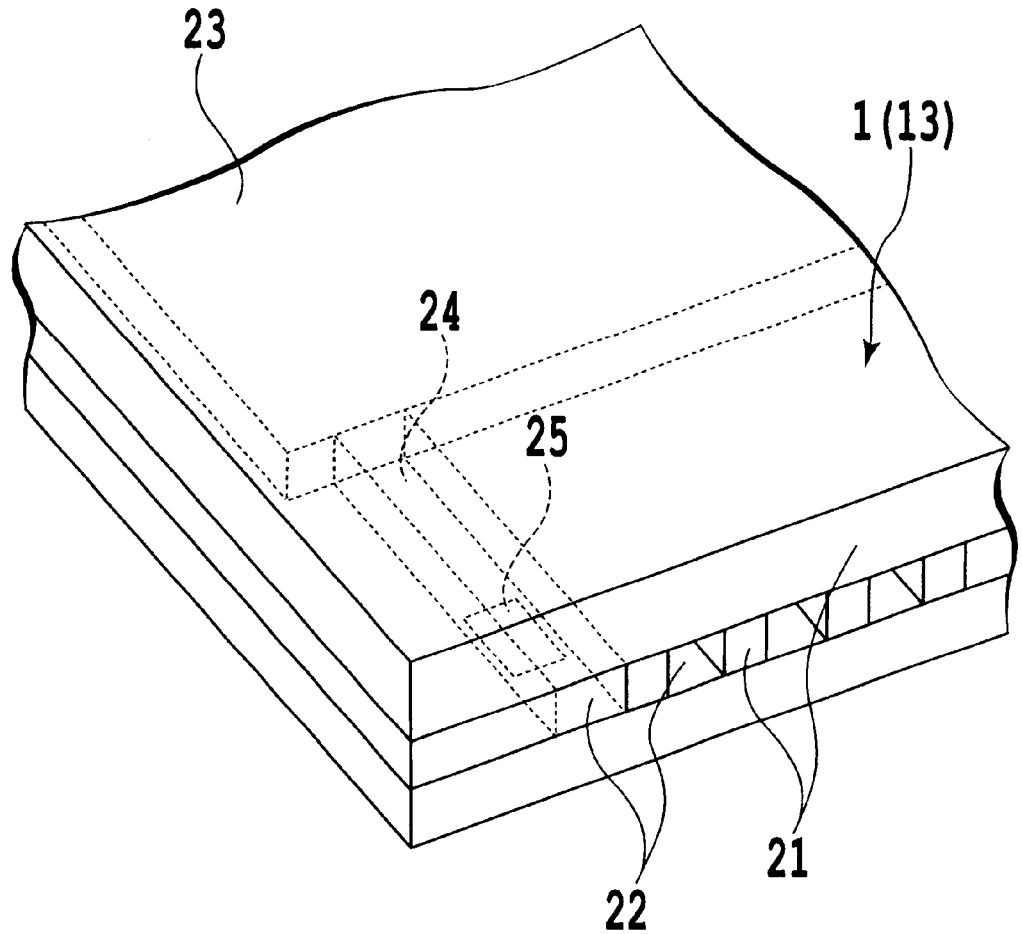
FIG. 14 is a perspective view schematically showing the construction of an essential part of the print heads shown in FIGS. 9A and 9B.

FIG. 14 is a partial perspective view schematically showing an essential-part construction of an ink ejection portion 13 of the first print head H1. As shown in FIG. 14, in a nozzle surface 21 facing the print medium 8 with a predetermined gap (about 0.5–2 mm) therebetween a plurality of nozzles 22 are formed at a predetermined pitch. On a wall surface of each passage 24 communicating a common liquid chamber 23 to each nozzle 22, the electrothermal transducer (such as a heating resistor) 25 is arranged for generating an ink ejection energy. In this example, the first print head H1 is mounted on the carriage 2 in such a positional relationship that a line of nozzles 22 intersects the scan direction of the carriage 2. Based on an image signal or ejection signal, the corresponding electrothermal transducers 25 are driven (energized) to cause film boiling in the ink in the passages 24, which in turn generates a pressure that expels the ink from the nozzles 22.

Configuration of Control Circuit

Figure 15:
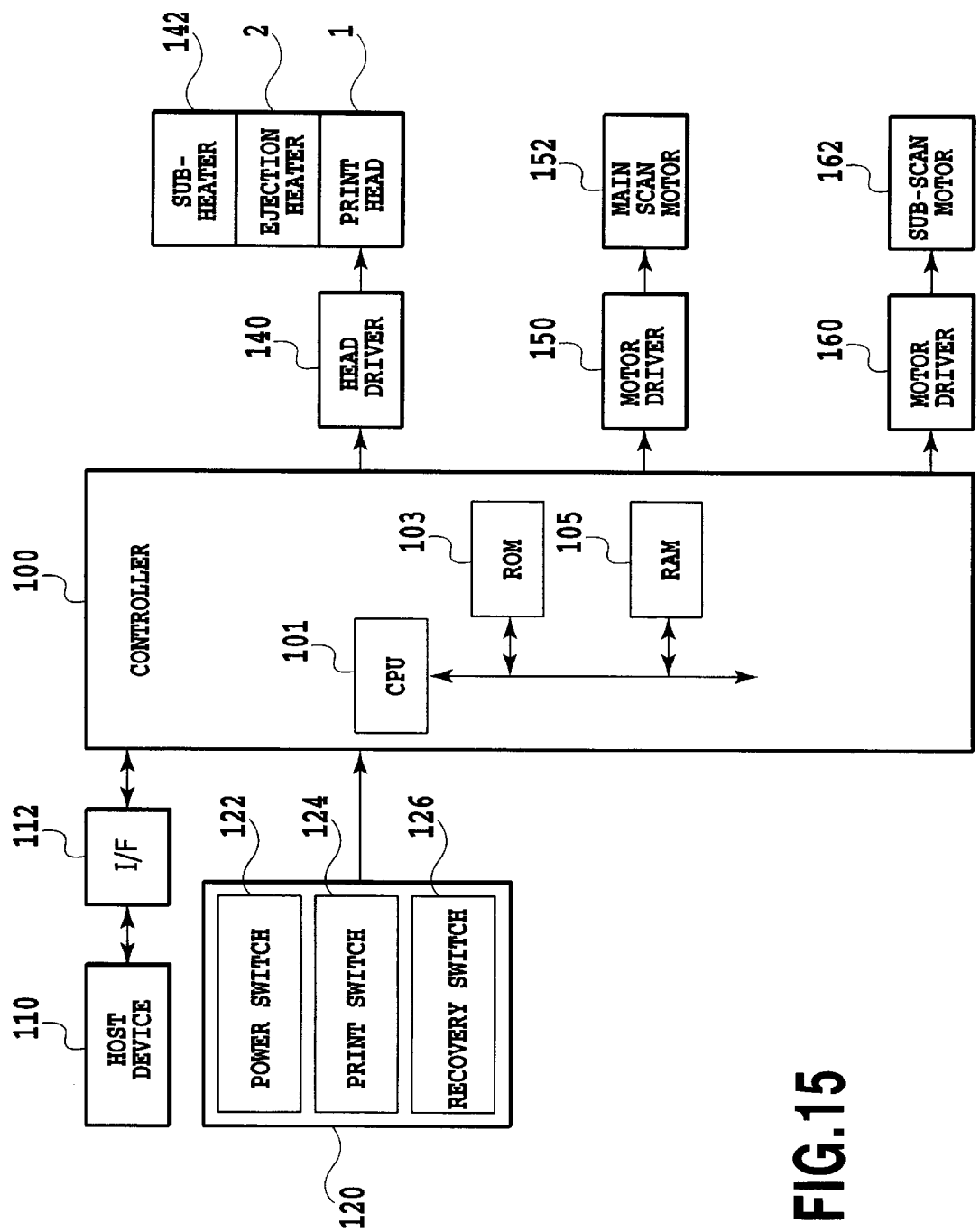
FIG. 15 is a block diagram showing an outline configuration of a control circuit in the ink jet printing apparatus according to embodiments of this invention.

FIG. 15 shows an example configuration of a control circuit in the ink jet printing apparatus of FIG. 13.

In FIG. 15, a controller 100 is a main control unit which has, for example, a microcomputer type CPU 101, a ROM 103 storing programs, tables and fixed data, and a RAM 105 providing an area for mapping image data and a work area. A host device 110 is a supply source of image data (it may be a computer that generates data to be printed, such as images, and performs various processing, or a reader for reading an image). The image data, commands, status signals and others are transferred to and from the controller 100 via an interface (I/F) 112.

An operation unit 120 has a group of switches for receiving command inputs from an operator, such as a power switch 122, a print start switch 124 and a recovery switch 126 for starting an operation to recover an ejection performance by suction.

A head driver 140 drives the ejection heaters 25 of the print head 1 according to the print data. The head driver 140 has a shift register for arranging the print data to match the corresponding positions of the ejection heaters 25, a latch circuit for latching the print data at an appropriate timing, logic circuit elements for activating the ejection heaters in synchronism with the drive timing signals, and a timing setting unit for appropriately setting the drive timing (ejection timing) for adjustment of dots formed.

The print head 1 has sub-heaters 142. The sub-heaters 142 are designed to adjust the temperature of ink to stabilize the ejection characteristic of the ink. The sub-heaters 142 may be formed on the print head board at the same time that the ejection heaters 25 are formed, or may be attached to the print head body or head cartridge.

A motor driver 150 drives a main scan motor 152; a sub-scan motor 162 feeds the print medium 8 in a sub-scan direction; and a motor driver 160 drives the sub-scan motor 162.

Nozzle Selection Sequence

In this first embodiment, the widths and positions of active nozzle groups are selected according to the print mode, a high speed print mode or a high quality print mode.

Figure 16:
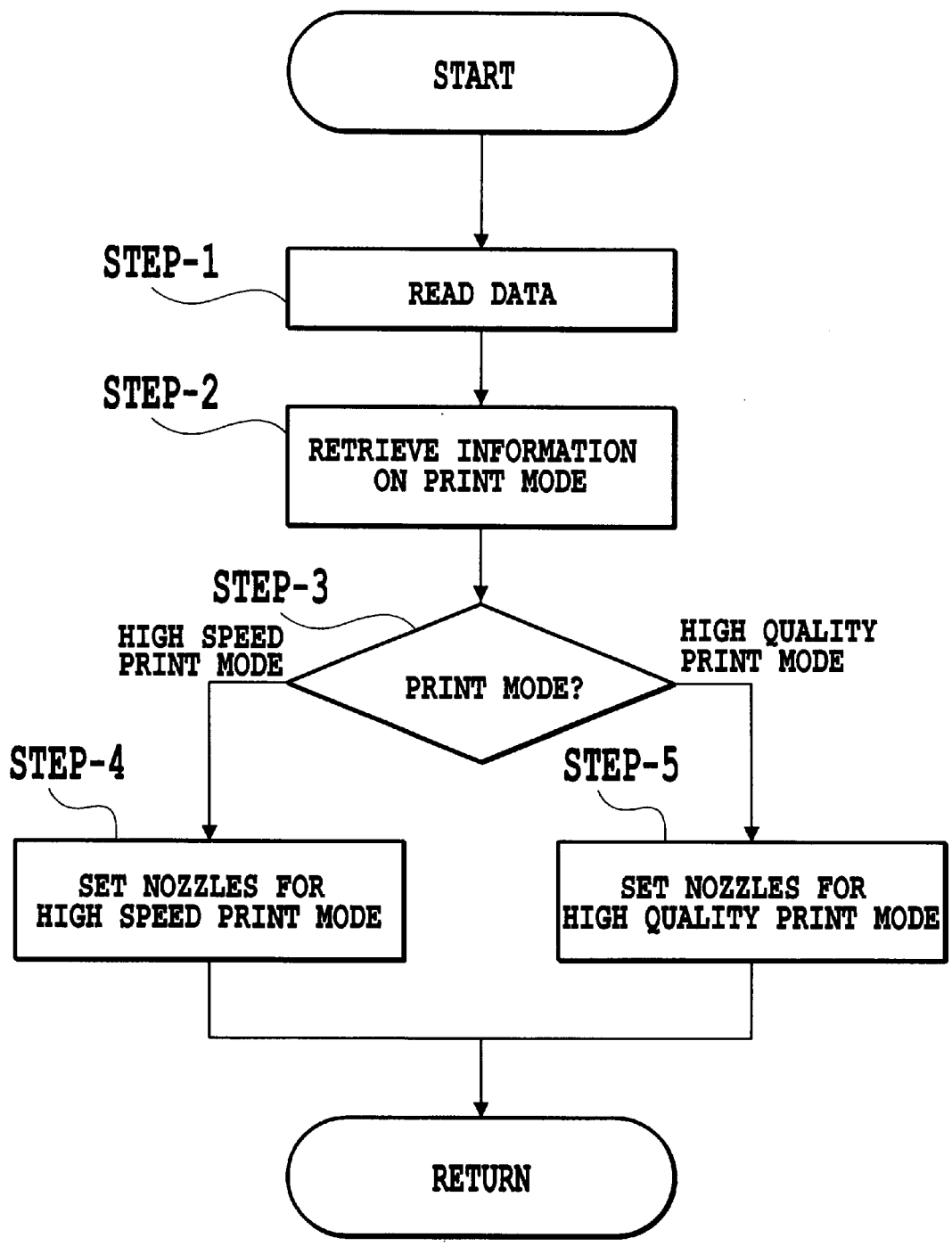
FIG. 16 is a flow chart showing one example sequence of selecting active nozzles in the print heads according to a first embodiment of the invention.

FIG. 16 is a flow chart showing an example of a nozzle setting selection sequence that implements this embodiment. First, at step-1, data to be printed is read. Next, at step-2, information on the print mode is retrieved from the header information attached to the print data. Next, at step-3, the print mode is checked. If the print mode is a high speed print mode, the processing proceeds to step-4 where a nozzle setting is made for the high speed print mode. If the print mode is a high quality print mode, the processing moves to step-5 where it makes a nozzle setting for the high quality print mode.

In the embodiments of the present invention, a print mode for printing a high quality image is called as a high quality printing mode, and a printing mode for printing an image at high speed is called as a high speed print mode.

In this way, according to the data to be printed, the nozzle setting can be made for the high speed print mode and for the high quality print mode, independently. Since the header information is normally attached to a head part of the print data, the active nozzle setting can be switched between the high speed print mode and the high quality print mode for each print job or for each page according to the header information. Example configurations of the active nozzles of the print heads that are set in each of the high speed print mode and the high quality print mode have been described in the Outline Configuration of the invention.

Variation of First Embodiment

Next, a variation of the first embodiment of this invention will be described by referring to the flow chart of FIG. 17.

Figure 17:
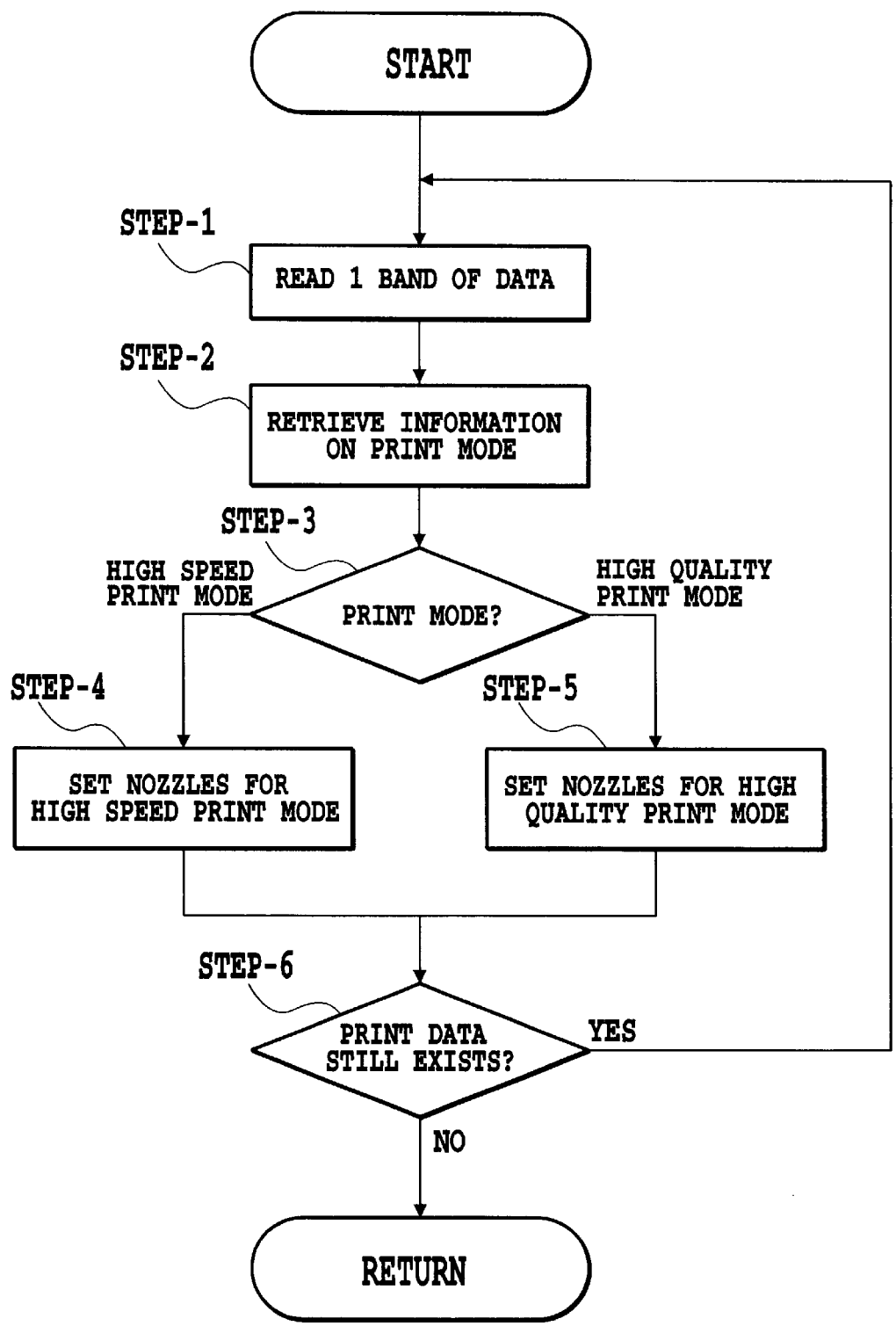
FIG. 17 is a flow chart showing a first variation of the sequence of selecting active nozzles in the print heads in the first embodiment of the invention.

FIG. 17 shows a flow chart of the nozzle setting selection sequence which is partly modified from that of FIG. 16. First, step-1 reads one band of print data. The one band of print data needs only to have an amount of data that can be processed for each particular print area, for example, an amount of data that can be processed at one time by the printing apparatus or one line of data for the high speed print mode. Next, step-2 retrieves information on the print mode from the header information attached to the print data. Next, step-3 checks the set print mode. If the print mode is a high speed print mode, the processing proceeds to step-4 where it sets nozzles for the high speed print mode. If the print mode is a high quality print mode, it moves to step-5 where it sets nozzles for the high quality print mode. Then, at step-6, it is checked if there is print data to be printed. If the print data exists, the same control procedure is repeated, beginning with step-1 until all print data is printed, at which time this sequence is terminated.

With this sequence, the active nozzles in the print head can be changed for each band, allowing for a more precise forming of an image. The information for changing the active nozzle setting may be provided in each band of print data or in only those portions of print data that require a setting change.

While the above explanation assumes the 1-pass bidirectional printing, it is possible also in the multipass printing to select between the print head of FIGS. 5A to 5D and the print head of FIGS. 6A and 6B. That is, also in the multipass printing that is applied to the high quality printing, a selection can be made between a high quality print mode and a high speed print mode. In this case, too, the control sequence is similar to those shown in FIG. 16 and FIG. 17 and can be expected to produce the same effect as in the 1-pass bidirectional printing.

Figure 18:
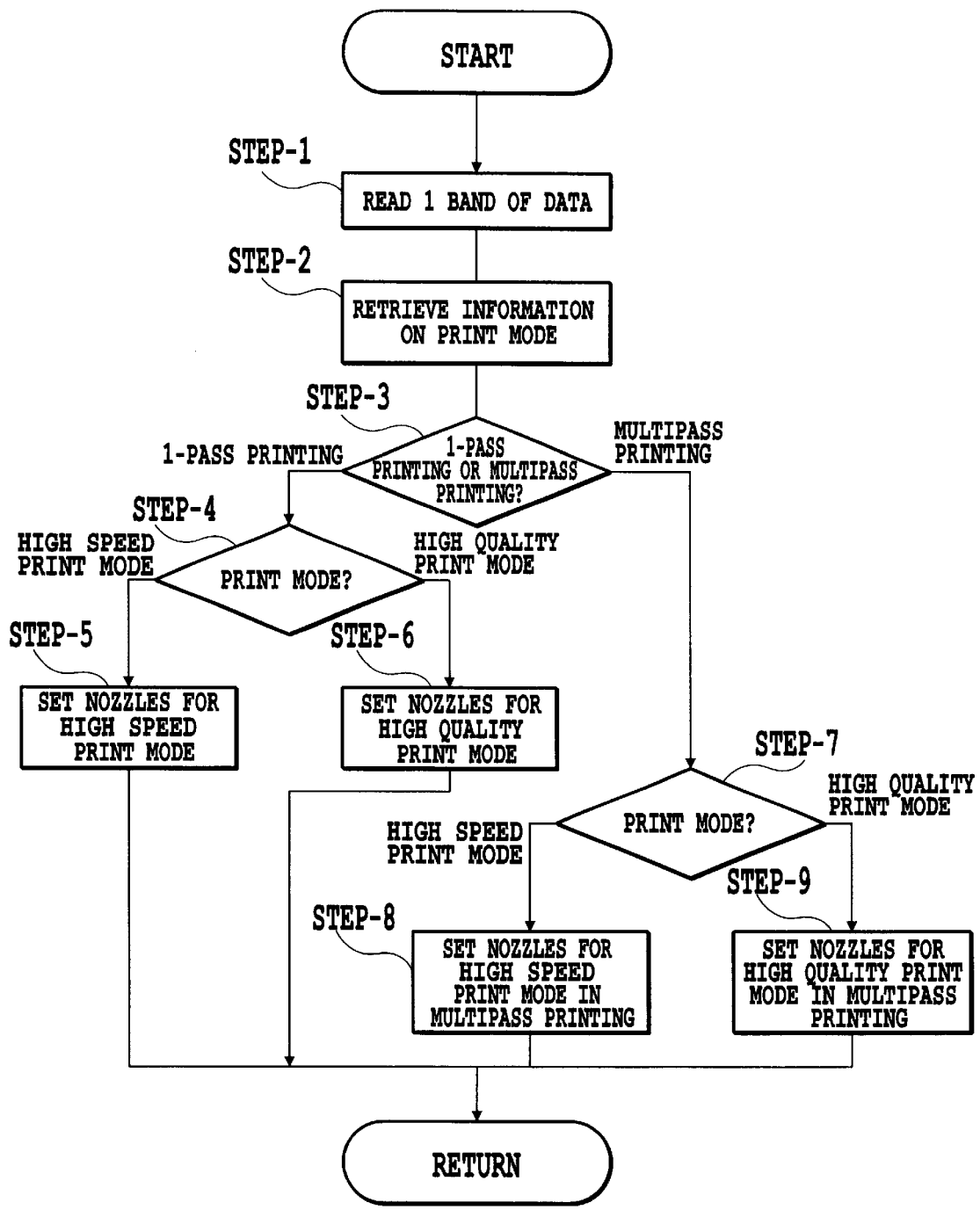
FIG. 18 is a flow chart showing a second variation of the sequence of selecting active nozzles in the print heads in the first embodiment of the invention.

Another variation of the first embodiment may implement a sequence shown in FIG. 18. This sequence selects between nozzles for 1-pass bidirectional printing and nozzles for multipass printing.

Step-1 reads data to be printed. Next, step-2 retrieves information on the print mode from the header information attached to the print data. Next, step-3 checks whether a 1-pass print mode or a multipass print mode is set. If the 1-pass print mode is found to be set, the processing moves to step-4 to further check the print mode. When a high speed print mode is found to be set, step-5 sets nozzles for the high speed print mode shown in FIGS. 5A to 5D. When a high quality print mode is detected, step-6 sets nozzles for the high quality print mode shown in FIGS. 6A and 6B.

When, at step-3, the multipass print mode is found to be set, step-7 further checks the print mode. If a high speed print mode is found selected, step-8 sets nozzles for the high speed print mode in the multipass printing. If a high quality print mode is found selected, step-9 sets nozzles for the high quality print mode in the multipass printing.

In this way, according to the print data to be printed, i.e., either in the 1-pass printing or multipass printing selected, the nozzle setting can be made for the high speed print mode or for the high quality print mode, independently. Since the header information is normally attached to a head part of the print data, the active nozzles can be selected between the high speed print mode and the high quality print mode for each print job or for each page. In this way, as in the 1-pass bidirectional printing, it is possible to selectively execute the fast multipass printing or the high quality multipass printing by limiting the active nozzles used in the print heads.

As described above, this embodiment allows optimum widths and positions of the active nozzle groups (numbers and positions of active nozzles) to be set for printing according to the print mode selected. That is, in the high speed print mode the nozzles most suited for high speed printing are specified within an applicable range. In the high quality print mode the nozzles are limited in the printing so as not to cause image impairments such as color deviations. This arrangement allows one printing apparatus to execute the high speed printing and the high quality printing.

Second Embodiment

Next, a second embodiment of the invention will be explained.

As in the first embodiment, the second embodiment of the invention relates to an ink jet printing which performs printing on a print medium by using a plurality of print heads and inks to form an image. As in the first embodiment, this embodiment also has the configurations of FIGS. 5A to 5D and FIGS. 6A and 6B described in the Outline Configuration of this invention and the configurations of FIG. 13 to FIG. 15 explained in connection with the first embodiment.

In the second embodiment, however, a check is made as to whether a boundary has occurred in an image and the check result is taken as a printing condition, according to which the widths and positions of active nozzle groups are selected.

The boundary detection performed in this embodiment concerns one between Bk data and color data as described later. It is, however, noted that the boundary detection is not limited to this combination of colors but can be applied to other color combinations.

Figure 19:
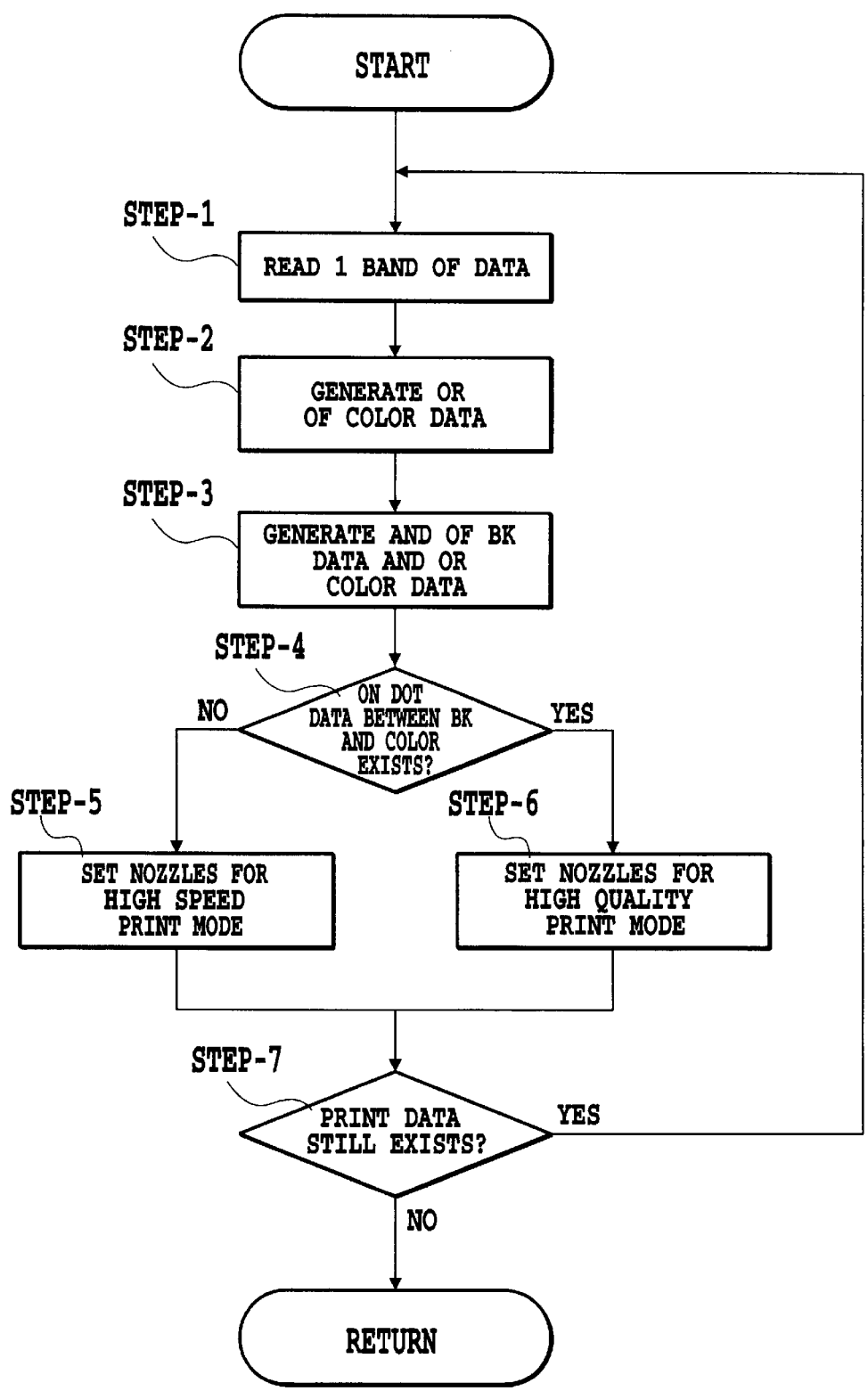
FIG. 19 is a flow chart showing one example sequence of selecting active nozzles in the print heads according to a second embodiment of the invention.

FIG. 19 shows an example of the nozzle setting selection sequence that implements this embodiment.

First, step-1 reads one band of data to be printed. The one band of print data needs only to have an amount of data that can be processed for each particular print area, for example, an amount of data that can be processed at one time by the printing apparatus or one line of data for the high speed print mode.

Next, step-2 generates OR (logical sum) data of color data to be processed. Next, step-3 creates AND (logical product) data of Bk (black) data and the color OR data. The AND data thus created represents ON dot data of color data and Bk data, indicating that there is a boundary between colors and Bk in the image. Next, step-4 checks whether there is ON dot data of colors and Bk. If no ON dot data exists, it is decided that there is no boundary. Step-5 sets nozzles for the high speed print mode.

If ON dot data exists, it is decided that there is a boundary and step-6 sets nozzles for high quality print mode. Then, step-7 checks whether there is print data to be printed. If the print data is found to exist, the same control is repeated starting with step-1 until all the print data is printed, at which time this sequence is ended.

Variation of Second Embodiment

Next, a variation of the second embodiment will be explained with reference to FIG. 20.

Figure 20:
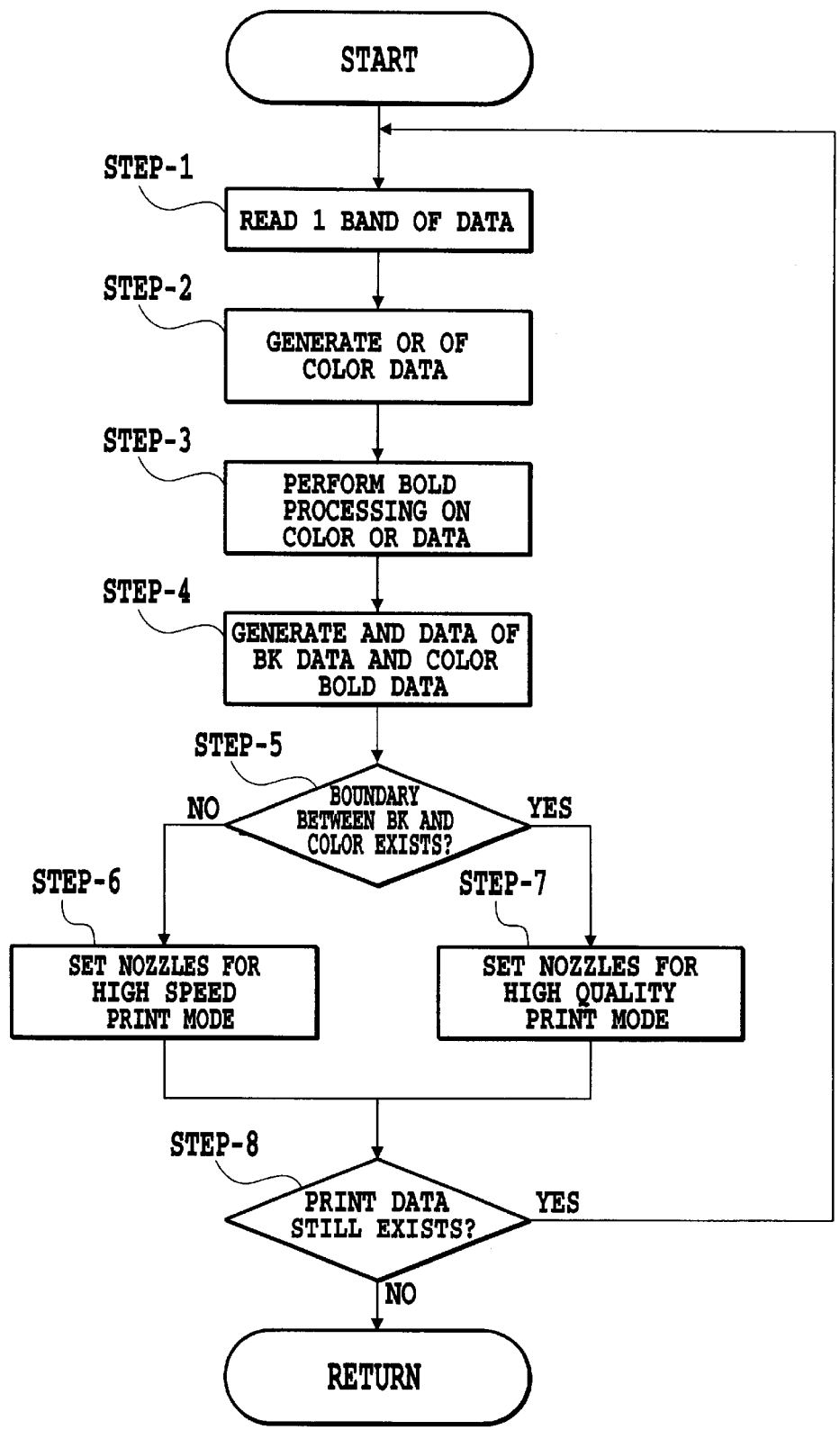
FIG. 20 is a flow chart showing a variation of the sequence of selecting active nozzles in the print heads according to the second embodiment of the invention.

FIG. 20 shows a control sequence which is partly modified from that of FIG. 19. A boundary detection checks whether a plurality of inks overlap due to ink spread. According to the result of this check, the widths and positions of the active nozzle groups are set.

FIG. 20 shows a variation of the nozzle setting selection sequence partly modified from that of FIG. 19.

In FIG. 20, step-1 reads one band of print data. The one band of print data needs only to have an amount of data that can be processed for each particular print area, for example, an amount of data that can be processed at one time by the printing apparatus or one line of data for the high speed print mode. Next, step-2 generates OR data of color data to be processed. Step-3 performs bold processing on the color OR data. The bold processing expands an area to be printed with data. For print data representing characters and lines, for example, the bold processing makes the characters and lines thicker or heavier. The amount by which the print data is bolded depends on the characteristics of inks and reflects the size of the boundary that corresponds to the degree of ink spread.

Next, step-4 creates AND data of Bk data and color bold data. The data thus generated is boundary data of Bk data and color data which indicates whether there is a boundary between Bk and colors in the image. Next, step-5 checks the presence or absence of the boundary data of Bk and colors. If there is no boundary data, it is decided that no boundary exists and step-6 sets nozzles for the high speed print mode. If boundary data exists, it is decided that there is a boundary and step-7 sets nozzles for the high quality print mode. Step-7 also checks whether there is still print data to be printed. If print data is found, the same control is repeated beginning with step-1 until all the print data is printed, at which time this sequence is ended.

As described above, the sequences shown in FIG. 19 and FIG. 20 check for each band the presence or absence of a boundary portion between Bk and colors in the print data. According to the result of the check, the nozzle setting is switched between the high speed print mode and the high quality print mode. Image impairments, such as caused by ejection time interval deviations, occur when there are overlaps among a plurality of inks. If there are no overlaps among a plurality of inks, the image impairments of course do not occur. With this fact taken into consideration, for data which is not likely to cause image impairments, a nozzle setting for the high speed print mode is selected. For data likely to cause image impairments, a nozzle setting for the high quality print mode is selected. This procedure makes it possible to efficiently switch the nozzle setting between the high speed print mode and the high quality print mode according to the image to be printed.

As described above, with the control method of the second embodiment, it is possible to use optimum widths of the active nozzle groups for the image data to be printed. That is, in the high speed print mode, nozzles most suited for the high speed printing are specified within an applicable range. In the high quality print mode, limitations are imposed on the nozzles so as not to cause image impairments such as color deviations. In this way, the high speed printing and the high quality printing can be selectively executed in one printing apparatus.

In this embodiment, the detection of ON dot data and the boundary detection based on bold processing have been described. A simpler detection method may be employed which checks whether Bk data and color data coexist on the same raster of the image data, i.e., whether both data are present on the same raster. Further, the check may be made for each raster or a plurality of rasters at one time. Furthermore, the check for the coexistence of Bk data and color data may be made by counting dots in a particular area.

Third Embodiment

Next, a third embodiment of this invention will be explained.

As in the first embodiment, the third embodiment of the invention relates to an ink jet printing which prints on a print medium by using a plurality of print heads and inks to form an image. As in the first embodiment, this embodiment also has the configurations shown in FIGS. 5A to 5D, FIGS. 6A and 6B, and also the configurations of FIG. 13 to FIG. 15.

In the third embodiment, however, the kind of print medium used is taken as a printing condition, according to which the widths and positions of the active nozzle groups in the print heads are selected.

Figure 21:
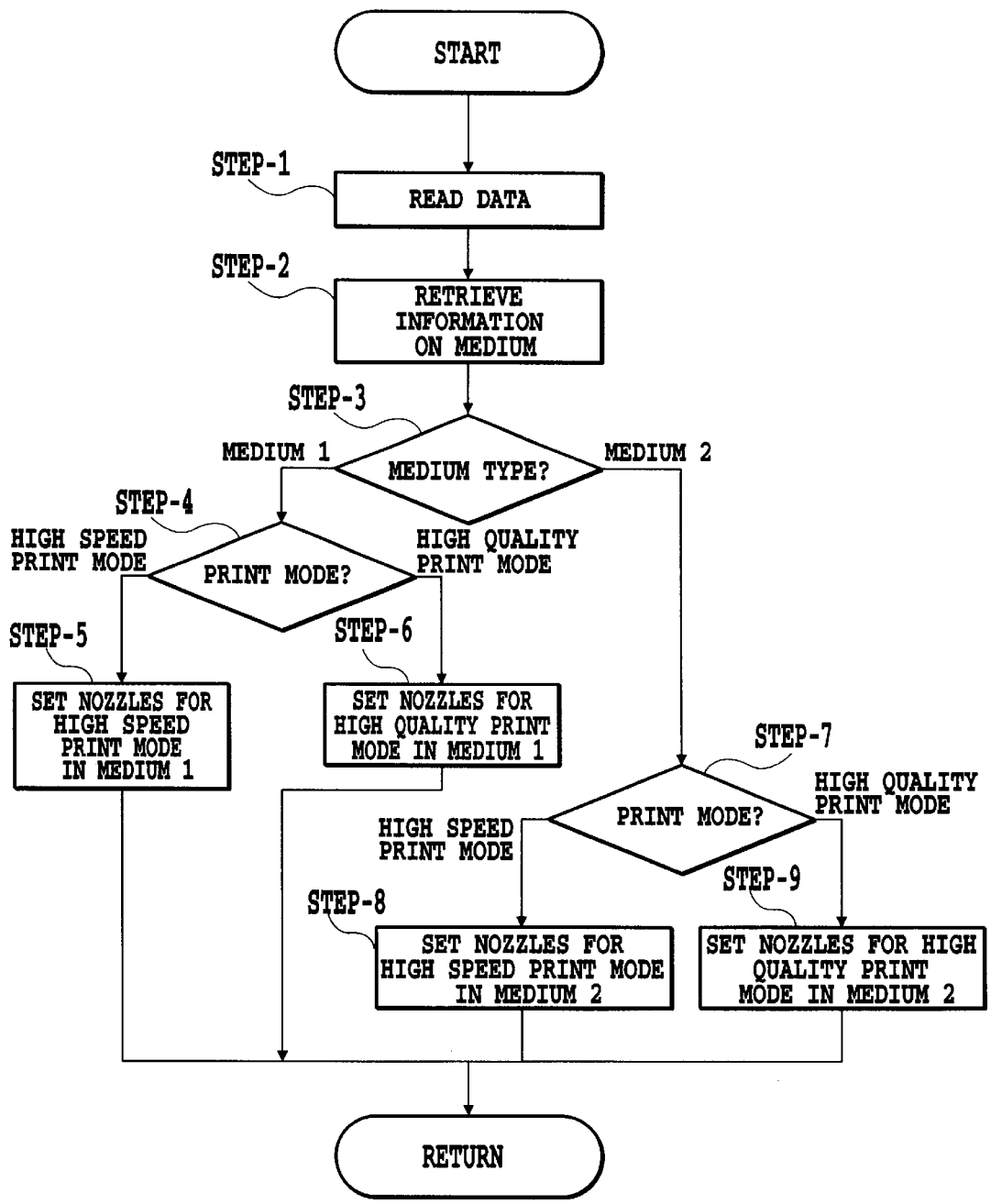
FIG. 21 is a flow chart showing one example sequence of selecting active nozzles in the print heads according to a third embodiment of the invention.

In FIG. 21, step-1 reads print data. Next, step-2 retrieves information on print medium as from the header information attached to the print data. Then, step-3 checks the kind of medium used. If the print medium is a medium 1, step-4 further checks the print mode. If the print mode is a high speed print mode, step-5 makes a nozzle setting for the high speed print mode as shown in FIGS. 5A to 5D. If the print mode is a high quality print mode, step-6 makes a nozzle setting for the high quality print mode.

In step-3, if the print medium is a medium 2, step-7 further checks the print mode. If the print mode is a high speed print mode, step-8 makes a nozzle setting for the high speed print mode. If the print mode is a high quality print mode, step-9 makes a nozzle setting for the high quality print mode. As described above, this embodiment can make the nozzle setting for the high speed print mode or the high quality print mode for each print medium used independently.

Since the header information including the print medium kind, or the printing condition, is normally attached to a head part of the print data, the active nozzle setting can be switched between the high speed print mode and the high quality print mode for each print job or for each page according to the header information.

There are a variety of print media with varying degrees of susceptibility to image impairments such as caused by ejection time interval deviations, ink ejection order and ink spread on boundaries. The susceptibility to image impairments depends on the characteristics of media and inks and thus it is preferred that the control be made for each particular medium used.

With this third embodiment, since the active nozzle setting for the high speed print mode or the high quality print mode can be made for each print medium independently, a control can be realized that conforms to the characteristic of the medium.

More specifically, when plain paper which is prone to cause an ink spread is used in the high speed print mode, print heads with large numbers of active nozzles as shown in FIG. 5D are used while avoiding simultaneous printing on the same print area during the same scan, to realize high quality printing without ink spread. In the high quality print mode, the print head configuration shown in FIGS. 6A and 6B is used and the ink ejection time difference between a plurality of print heads in each print area is set equal to one scan period, thereby realizing the high quality printing without ink spread.

When coated paper is used, since it does not cause ink spread at boundaries between different colors, the print head configuration of FIG. 5B is used in the high speed print mode and a nozzle setting that allows the fastest printing in the apparatus is selected. In the high quality print mode, the print head configuration of FIG. 6B is used to set to one scan period the ink ejection time difference between a plurality of print heads in each print area at all times, thereby realizing the high quality printing. When it is not necessary to provide an ink ejection time difference between a plurality of print heads in each print area, the same nozzle setting may be used for both the high quality printing and the high speed printing. In this way, a variety of nozzle settings can be made in accordance with the characteristics of the media used.

The sequence shown in FIG. 21 has been described in connection with two kinds of media 1, 2. It is also possible to make a nozzle setting for each of three or more kinds of media according to their characteristics. The present invention is not limited to the embodiment described above.

As described above, the third embodiment allows the positions and widths of active nozzle groups (numbers of active nozzles) to be set to optimum conditions according to a print medium used, thus producing a high image quality. Further, for each kind of medium, nozzle settings can be made for the high speed print mode and the high quality print mode. This in turn makes it possible to selectively execute the high speed printing and the high quality printing in one printing apparatus.

Fourth Embodiment

A fourth embodiment of this invention represents a case in which the present invention is applied to a printing apparatus with a null skip function. The null skip is a known function which checks if there is data representing successive blank (null) portions in the image data to be printed and, if null portions are found, feeds the print medium to where the image data exists. The null skip is defined as an operation which detects data representing successive blank (null) portions, having no image data, in an image data to be printed in the sub-scan direction where a plurality of nozzles are arranged, resulting in performing no printing corresponding to said blank portions but feeding a print medium to where the image data exists following to the blank portions in said sub-scan direction, wherein when the high quality print mode is set. To keep the print time interval between a plurality of print heads constant in each print area, the above null skip is inhibited when end portions of an image are printed by a plurality of print heads.

This embodiment, too, has a configuration shown in FIG. 13 to FIG. 15 explained in connection with the first embodiment. The print heads used are also configured as shown in FIGS. 5A to 5D, FIGS. 6A and 6B, and their nozzle setting can be changed by the selection sequence.

The processing performed during the high quality print mode of FIG. 7 will be explained by referring to FIG. 22.

Figure 22:
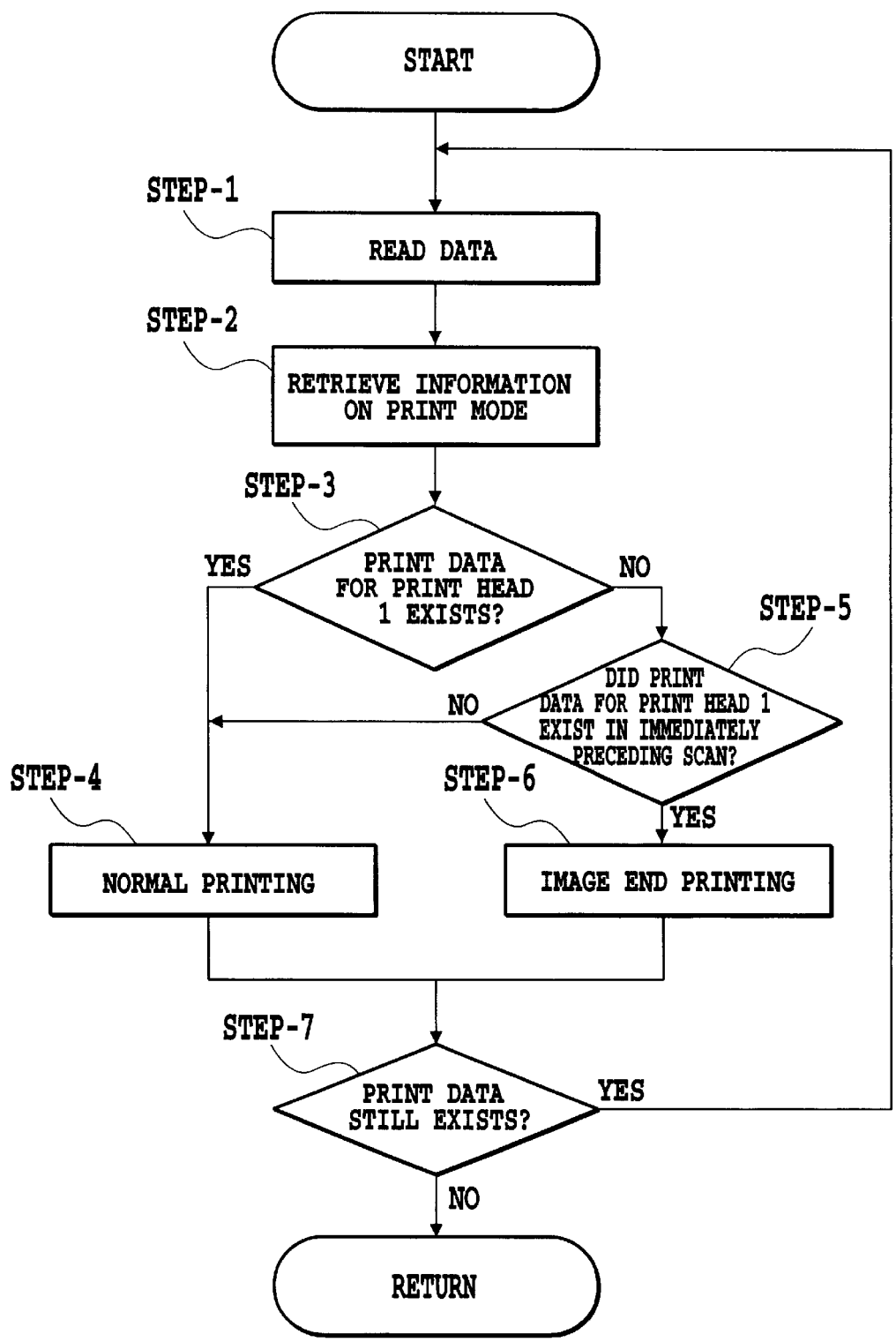
FIG. 22 is a flow chart showing one example sequence of selecting active nozzles in the print heads according to a fourth embodiment of the invention.

FIG. 22 shows an example control sequence for image end processing in this embodiment. In FIG. 22, step-1 reads data to be printed. Next, step-2 retrieves information on the print mode as from the header information attached to the print data. Then, step-3 checks whether there is print data for a print head 1 which prints first on the print area.

When the print data is found to exist, step-4 performs a normal printing operation, i.e., executes printing action by repetitively alternating the sub-scan of normal width and the main scan. In a continuous image, this normal printing operation is performed in almost all of the image area except for its rear end. When the print data is found not to exist, step-5 checks if there was the print data for the print head 1 in the immediately preceding scan.

When it is decided that there was the print data, step-6 performs the image end printing. If it is decided that the print data did not exist, step-4 performs the normal printing operation. Next, step-7 checks if print data to be printed still exists. When print data is found to exist, the same control as described above is repeated from step-1 until all the print data is printed, at which time this sequence is terminated.

As described above, this sequence performs the image end printing only when the print data for the print head 1 does not exist in the current scan but existed in the immediately preceding scan. In other cases, i.e., when print data for the print head 1 does not exist for two or more successive scans, it is decided that the print area in question is either a blank area of null data not located at the ends of an image (complete null data) or an image area that is to be printed only by the print head 2. Hence, this print area does not require the image end printing and is processed by the normal printing.

When print data exists in the form of complete null data, the print medium is quickly moved in the sub-scan direction to where there is print data (the null skip is done) to improve the printing speed. When a print area is the one to be printed only by the print head 2, the sub-scan of normal width and the main scan are repetitively alternated to perform the normal printing. Further, the normal printing is also performed when there is data for the print head 1 during the current scan. As in the first embodiment, during the normal printing operation, the print time interval between a plurality of print heads is kept constant to achieve high quality printing as shown in FIG. 7.

Now, the image end printing will be explained.

Figure 4:
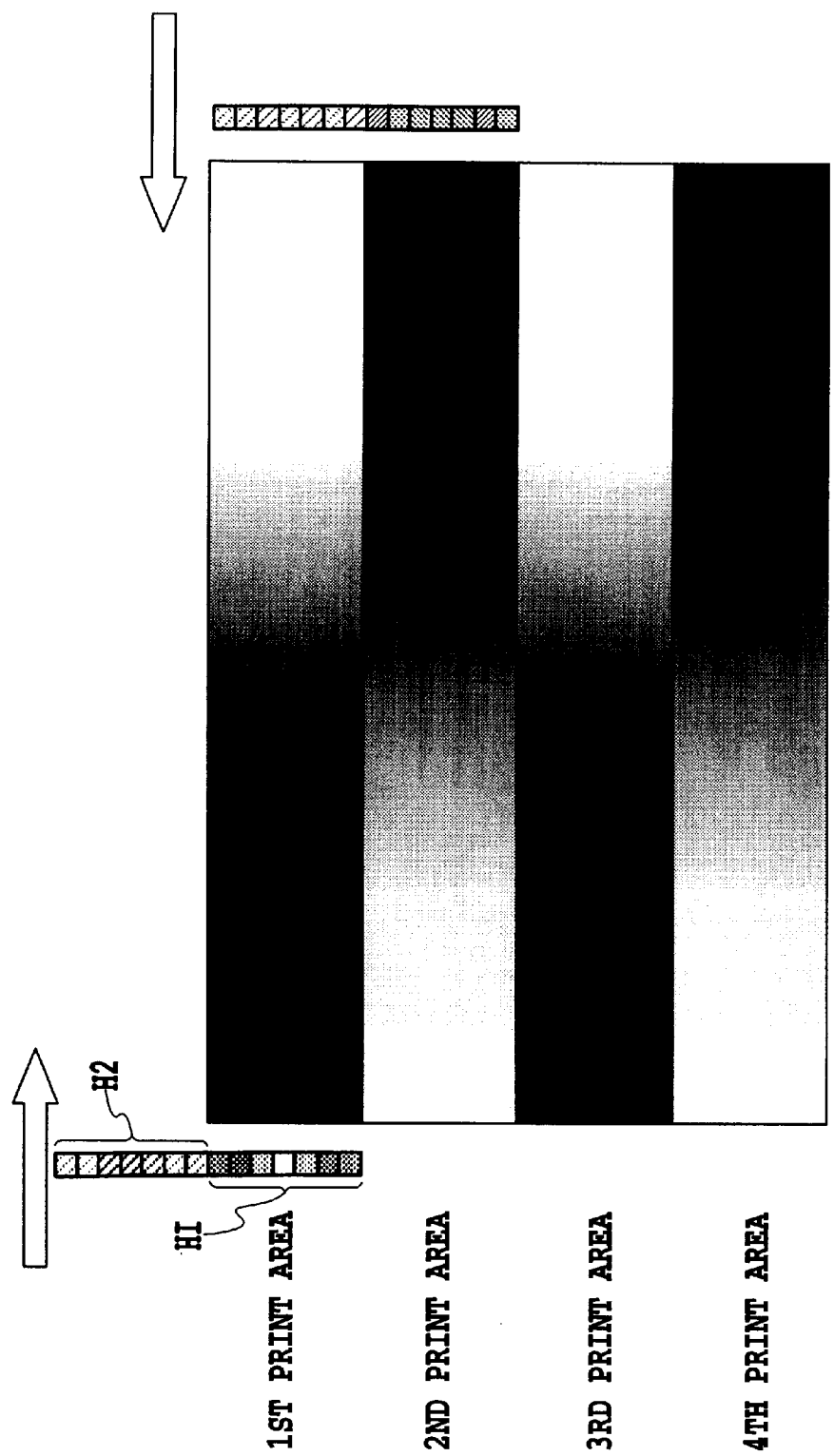
FIG. 4 is an explanatory plan view showing how color deviations are caused by a time difference between ink ejection operations in a bidirectional printing.

A first example of the image end printing is an inhibition of the null skip. When the print data is complete null data as described above, i.e., the null data is not image end data, the print medium is quickly moved in the sub-scan direction (null skip is performed) for improving the printing speed. For the complete null data, image impairments are not caused because the area from which to start the null skip is not at the ends of an image. However, when the null skip is performed in an end area of an image, there is a possibility that the print heads may print on a print area at the end of an image in different directions. This means the order of printing may be changed during the printing process. When the scan directions differ, the ink ejection time difference (print time interval) between a plurality of print heads cannot be kept constant, causing color variations as shown in FIG. 4 and degrading an image quality.

Therefore, while the printing operations by a plurality of print heads in one print area are not finished, even if there is null data, the null skip is inhibited unless the null data is complete null data. The control performed after the null skip has been inhibited involves executing one scan without printing (ink ejection) and thereafter performing the normal printing. With this operation, the print time interval between a plurality of print heads can be kept constant even at ends of an image.

A second example of the image end printing concerns making the print heads scan each print area in the same direction. The direction in which the second print head H2 prints on a print area that was printed by the first print head H1 is the same as the direction in which the first print head H1 performed printing. Thus, the same effect as when the null skip is inhibited in the first example can be obtained. In this case, although there is no need to check whether the print data is complete null data, as required in the first example, it is necessary to remember the printing direction for each print area.

One example of actually executing the image end printing will be explained by referring to FIG. 7.

For example, when there is image data in a first print area to a third print area and there is no image data in a fourth print area, the printing operation will be as follows. First, during the first scan the first print head H1 prints on the first print area. During the second scan the first print head H1 prints on the second print area. During the third scan the first print head H1 prints on the third print area while at the same time the second print head H2 prints on the first print area. So far, the normal printing is performed.

Next, the fourth scan will be performed. When at this time there is no image data either for the first print head H1 or for the second print head H2, the fourth scan has no image data at all. So, in the conventional printing apparatus with the null skip function, the null skip is done to reach data that is to be printed by the fifth scan.

However, because the elimination of the fourth scan causes the fifth scan to be performed immediately after the third print area has been printed by the print head 1, one idle scan period is not interposed between the printing scans of the first and second print heads, as it is in other print areas. Thus, the printed result is as shown in FIG. 4, giving rise to a possibility of image impairments such as color deviations.

Therefore, in this example, the null skip is inhibited as in the first example of the image end printing and the fourth scan without ink ejection is performed to keep the print time interval between the two print heads in the third print area constant, thus realizing the high quality printing. Further, by remembering the printing direction for each print area, as in the second example of the image end printing, the printing directions can be made the same to enhance the print quality. In this case, the print time interval between a plurality of print heads may be kept constant by performing the fourth scan after having performed the third scan without ink ejection.

By performing these image end printing operations, it is possible to align the printing directions. The sequence shown in FIG. 22 represents a sequence when the high quality print mode is selected. In other modes, the image end printing is not carried out and only the normal printing is done. In this case, the normal printing includes the null skip.

As described above, the second example can keep the print time interval between a plurality of print heads constant in each of print areas. That is, in the high quality print mode, which imposes limitations on the use of the nozzles in such a way as to prevent image impairments such as color deviations, the print time intervals between a plurality of print heads can be kept constant in each print area, thus efficiently achieving the high quality printing.

Fifth Embodiment

A fifth embodiment of the invention, as in the fourth embodiment, forms an image by printing on a print medium by using a plurality of print heads and inks. This embodiment controls in each scan the print time interval between a plurality of print heads in each print area to keep it constant. In this fifth embodiment, too, as in the fourth embodiment, the head configurations shown in FIG. 13 to FIG. 15 are used. Further, in this embodiment, the print time taken to print each print area by the print heads is stored in a memory means.

As shown in FIG. 23, the memory means stores print time 1 to print time 5 required to print the corresponding print areas, first to fifth print area. The print time does not have to be an absolute time but a relative time may be used. So, the time required for printing is measured as by a timer of CPU.

Next, the control sequence of this embodiment will be explained by referring to FIG. 24. Here, a printing operation in the high quality print mode such as shown in FIG. 7 is taken for example.

Figure 24:
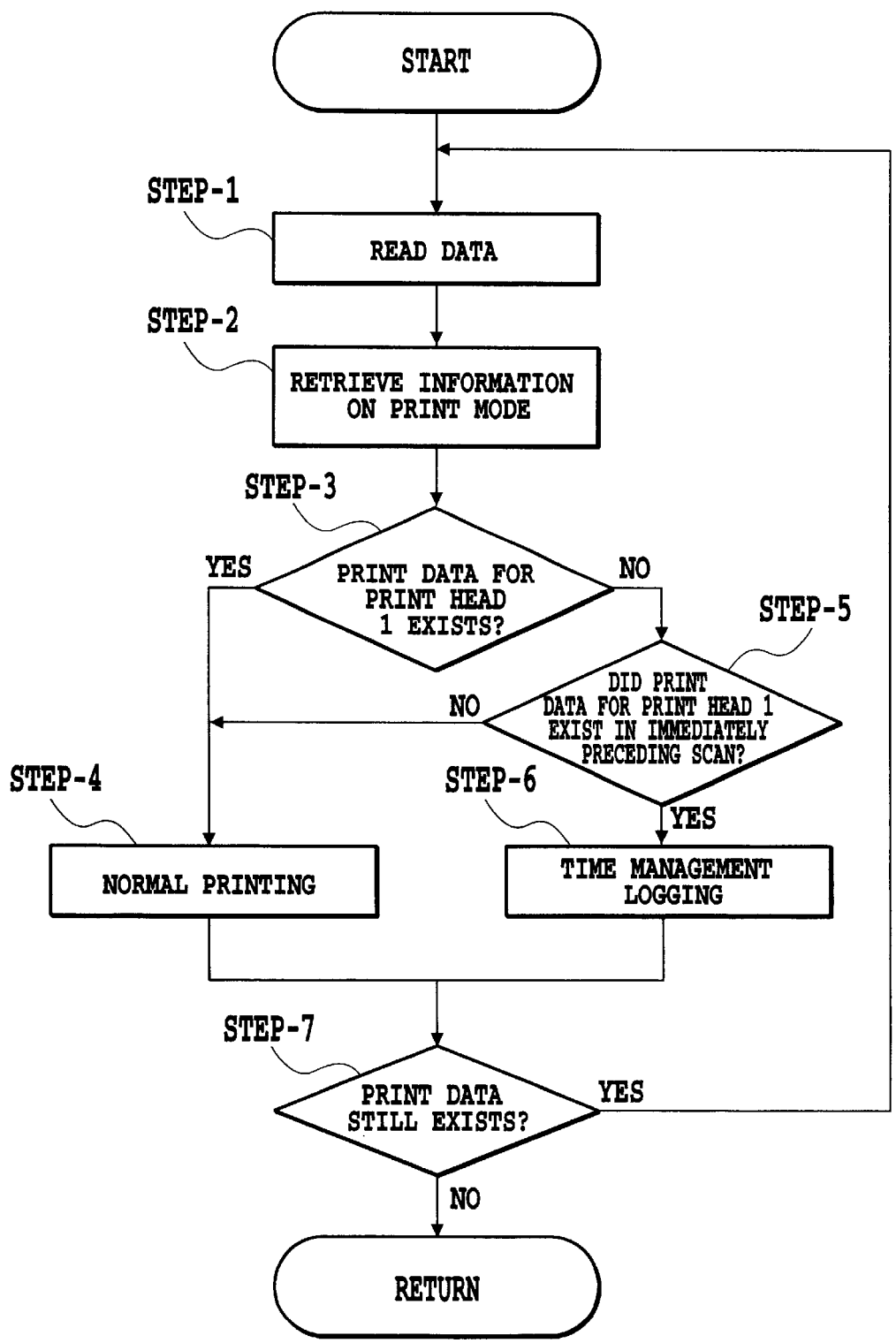
FIG. 24 is a flow chart showing a variation of the sequence of selecting active nozzles in the print heads according to the fifth embodiment of the invention.

In FIG. 24, step-1 reads data to be printed. Next, step-2 retrieves information on the print mode from the header information accompanying the print data. Next, step-3 checks if there is print data for the first print head H1 that prints first. When there is print data for the first print head H1, step-4 performs normal printing. In a continuous image, almost all print areas except for the rear end portion are printed by the normal printing.

When there is no print data for the first print head H1, step-5 checks whether print data for the first print head H1 existed in the immediately preceding scan. Here, if the print data is found to have existed, step-6 performs a time control logging. When there was no print data in the immediately preceding scan, step-4 performs the normal printing. Next, step-7 checks whether there is still print data to be printed. If print data still exists, the same control sequence is repeated from step-1 until all the print data is printed, at which time this sequence is ended.

Here, the time control logging will be explained.

The time control logging uses the memory means, which stores the data shown in FIG. 23, to control the print time for each print area so that the print time interval will not be less than a predetermined time. That is, the time control logging, before starting the scan for each print area, refers to the memory means to retrieve the print time for the immediately preceding scan performed on the same print area and, based on the print time, waits until a time interval between the starting times of the current scan and the immediately preceding scan reaches a preset time interval, at which time the printing is started. That is, the printing operation is controlled so that the print time interval between different print heads is always equal to or greater than a predetermined value.

As described above, the control method of the fifth embodiment can control the print time interval between a plurality of print heads in each print area and thereby keep the print time interval almost constant. That is, in the high quality print mode, which imposes limitations on the use of the nozzles to prevent image impairments such as color deviations, it is possible to keep the print time interval between a plurality of print heads constant throughout the entire image area, thereby realizing an efficient high quality printing.

Sixth Embodiment

Next, a sixth embodiment will be explained.

The sixth embodiment of the invention, as in the fourth embodiment, forms an image by printing on a print medium by using a plurality of print heads and inks. To keep the print time interval between a plurality of print heads in each print head constant, this embodiment sets the time interval between the main scans constant. As in the first embodiment, the fifth embodiment also has the print head configurations shown in FIG. 13 to FIG. 15.

Here, the width of the scan performed in the high quality print mode of FIG. 7 will be described.

Figure 25:
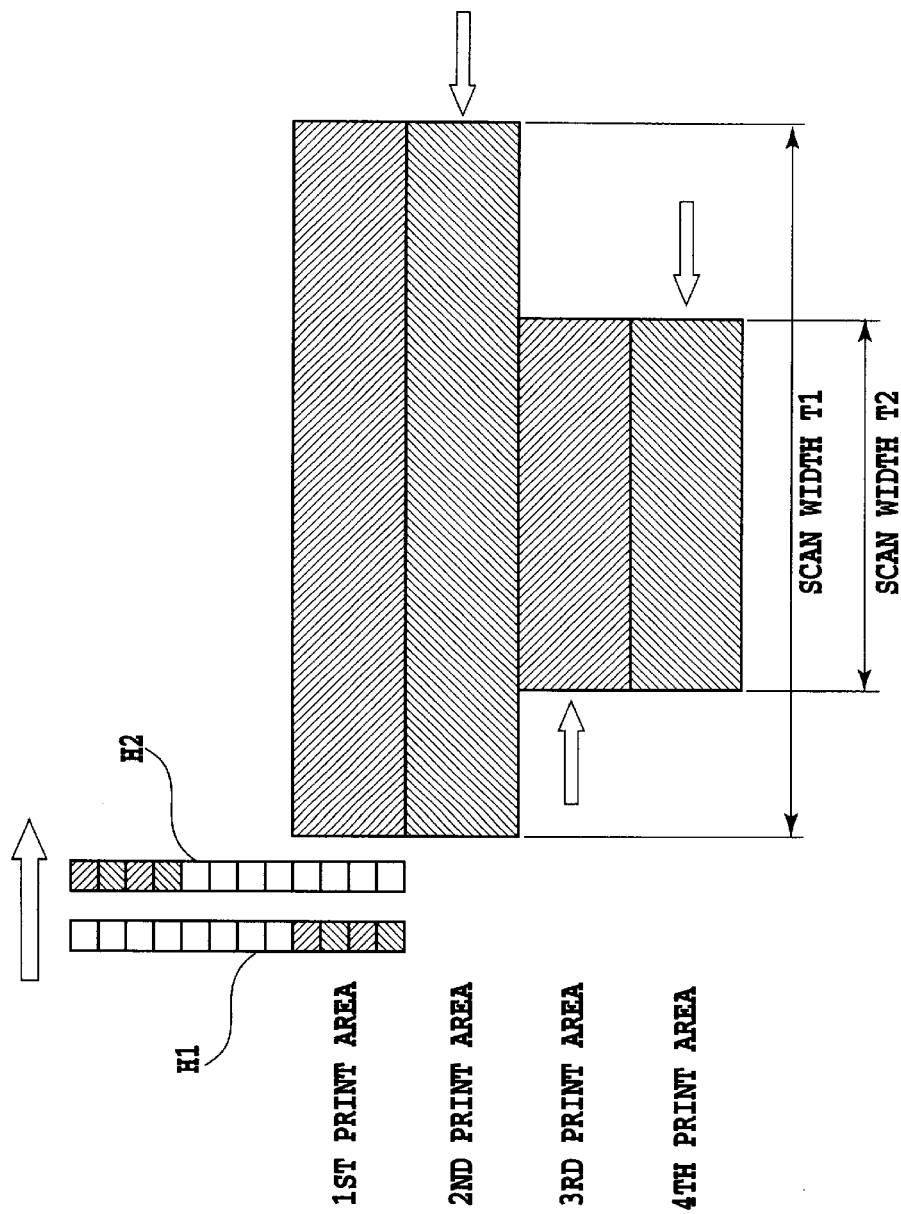
FIG. 25 is a diagram showing scan widths in the printing operation performed in the high speed print mode according to a sixth embodiment of the invention.

This embodiment is shown in FIG. 25.

In FIG. 25, the widths of image data differ between the second print area and the third print area. In this case, when the scan is performed according to the print data, the main scans of the second print head H2 in the third and fourth print areas have widths different from those of the main scans of the first print head H1. That is, the time intervals between the main scans differ among the print areas, giving rise to a possibility of causing image impairments such as color deviations.

To deal with this problem, the sixth embodiment performs control to make the scan widths of the first print head H1 and the second print head H2 equal in each print area. For example, in FIG. 25, the scan width of the second head in the third print area is set not to a main scan width T2 produced by the normal printing but to a longer main scan width T1. Similarly, in the fourth print area, the main scan width T1 is used. In this manner, the control of this embodiment suppresses a sharp reduction in the main scan width. That is, when it is desired to reduce the scan width considering the ink spread at boundaries, it is possible to prevent the image impairments that would be caused by deviations in the print time interval between print heads, thus forming a high quality image. It is noted that when the scan width increases, this control does not need to be executed.

As described above, with the control method of this embodiment, the time interval can be made almost constant by setting the scan widths of a plurality of print heads equal in each print area. This is particularly effective in dealing with ink spread at boundaries that would occur when the main scan widths are short. In the high quality print mode, which controls the widths of the active nozzle groups in the print heads so as to prevent image impairments such as color deviations, the print time intervals between a plurality of print heads can be kept almost constant, thus realizing a high quality printing.

Others

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet printing apparatus comprising:
   printing means having a plurality of print heads, each having a plurality of ink ejection nozzles formed therein, the print heads ejecting different kinds of ink to print on a print medium; and
   print head control means for controlling, for each print head independently, widths and positions of active nozzle groups in the print heads, the active nozzle groups representing those of the plurality of nozzles in the print heads which are used for printing,
   wherein said print head control means controls the widths and positions of the active nozzle groups according to a set printing condition, the set printing condition being independent of print data to be printed.

2. An ink jet printing apparatus according to claim 1, wherein said print head control means takes at least one of a print speed, a print quality, print data and a kind of print medium as the printing condition and, according to the printing condition, controls the widths and positions of the active nozzle groups.

3. An ink jet printing apparatus according to claim 1, wherein said print head control means makes a setting so that the widths of the active nozzle groups in the plurality of print heads are equal.

4. An ink jet printing apparatus according to claim 1, wherein said print head control means increases or decreases the widths of the active nozzle groups in the print heads according to an increase or decrease in a printing speed setting.

5. An ink jet printing apparatus according to claim 1, wherein said printing means reciprocally moves in a main scan direction relative to a print medium to perform a bidirectional printing which executes a printing operation in both a forward and a backward pass, and
   said print head control means sets the widths and positions of the active nozzle groups in such a way that printing directions of the plurality of print heads are equal in one and the same print area.

6. An ink jet printing apparatus according to claim 1, wherein said printing means performs scans of a plurality of different print heads over one and the same print area to form a printed area, and
   said print head control means sets the widths and positions of the active nozzle groups in such a way that the scans of a plurality of print heads over one and the same print area are performed at different timings.

7. An ink jet printing apparatus according to claim 1, wherein said print head control means sets the widths of the active nozzle groups according to the number of scans executed over one and the same print area.

8. An ink jet printing apparatus according to claim 1, wherein a print mode for printing an image at high speed can be selected, and said print head control means, according to the selected print mode for printing an image at high speed, sets the widths of the active nozzle groups in the plurality of print heads to a maximum width.

9. An ink jet printing apparatus according to claim 1, wherein a print mode for printing an image at high speed can be selected, and said print head control means, according to the selected print mode for printing an image at high speed, sets the widths of the active nozzle groups in the plurality of print heads equal to a width of one sub-scan executed in a direction crossing the main scan direction and sets the widths and positions of the active nozzle groups in such a way that the active nozzle groups in adjoining ones of the plurality of print heads do not overlap each other in the main scan direction, and that ends of the active nozzle groups in the plurality of print heads align with each other in the sub-scan direction.

10. An ink jet printing apparatus according to claim 1, wherein said printing means is arranged in such a way that the adjacent print heads partly overlap each other in the main scan direction.

11. An ink jet printing apparatus according to claim 1, wherein said printing means is arranged in such a way that the adjacent print heads completely overlap each other in the main scan direction.

12. An ink jet printing apparatus according to claim 1, wherein the print heads generate bubbles in the inks by thermal energy and, based on the energy of the bubbles, eject the inks.

13. An ink jet printing apparatus comprising:
   printing means having a plurality of print heads, each having a plurality of ink ejection nozzles formed therein, the print heads ejecting different kinds of ink according to print data associated with the print heads to print on a print medium;

print head control means for controlling, for each print head independently, widths and positions of active nozzle groups in the print heads, the active nozzle groups representing those of the plurality of nozzles in the print heads which are used for printing; and boundary detection means for detecting boundaries between a plurality of print data associated with the print heads, wherein said print head control means controls the widths and positions of the active nozzle groups according to a detection result produced by said boundary detection means.

14. An ink jet printing apparatus according to claim 13, wherein said boundary detection means detects overlaps between the plurality of print data.

15. An ink jet printing apparatus according to claim 13, wherein said boundary detection means performs bold processing on the print data to expand areas to be printed with the print data and detects a closeness between the plurality of print data.

16. An ink jet printing apparatus comprising:

printing means having a plurality of print heads, each having a plurality of ink ejection nozzles formed therein, the print heads ejecting different kinds of ink to print on a print medium;

print head control means for controlling, for each print head independently, widths and positions of active nozzle groups in the print heads, the active nozzle groups representing those of the plurality of nozzles in the print heads which are used for printing; and print medium information retrieving means for retrieving information on the print medium, wherein said print head control means controls the widths and positions of the active nozzle groups according to the information retrieved by said print medium information retrieving means.

17. An ink jet printing apparatus according to claim 1, wherein a print mode can be selected from among a plurality of print modes representing different print qualities, and said print head control means, according to a selected print mode for forming a high quality image, sets the widths of the active nozzle groups in the plurality of print heads equal to a width of one sub-scan executed in a direction crossing the main scan direction and sets the positions of the active nozzle groups at such positions that the same width as the sub-scan is interposed between the adjacent print heads.

18. An ink jet printing method for printing on a print medium by ejecting different kinds of ink from a plurality of print heads, each having a plurality of ink ejection nozzles, the ink jet printing method comprising:

a printing condition setting step;

a print head control step, of controlling, for each print head independently, widths and positions of active nozzle groups in the print heads according to a set printing condition, the set printing condition being independent of print data to be printed, the active nozzle groups representing those of the plurality of nozzles in the print heads which are used for printing; and a printing step, of printing by the plurality of print heads according to the widths and positions of active nozzle groups set in said print head control step.

19. An ink jet printing method for printing on a print medium by ejecting different kinds of ink from a plurality of print heads, each having a plurality of ink ejection nozzles, according to print data associated with the print heads, the ink jet printing method comprising:

a boundary detection step, of detecting boundaries between the plurality of print data associated with the print heads;

a print head control step, of controlling, for each print head independently, widths and positions of active nozzle groups in the print heads according to a detection result produced in said boundary detection step, the active nozzle groups representing those of the plurality of nozzles in the print heads which are used for printing; and a printing step, of printing by the plurality of print heads according to the widths and positions of active nozzle groups set in said print head control step.

20. An ink jet printing method for printing on a print medium by ejecting different kinds of ink from a plurality of print heads, each having a plurality of ink ejection nozzles, the ink jet printing method comprising:

a print medium information retrieving step, of retrieving information on the print medium;

a print head control step, of controlling, for each print head independently, widths and positions of active nozzle groups in the print heads according to the retrieved information on the print medium, the active nozzle groups representing those of the plurality of nozzles in the print heads which are used for printing; and a printing step, of printing by the plurality of print heads according to the widths and positions of active nozzle groups set in said print head control step.

21. An ink jet printing apparatus comprising:

printing means having a plurality of print heads, each having a plurality of ink ejection nozzles formed therein, the print heads ejecting different kinds of ink to print on a print medium; and print head control means for controlling, for each print head independently, widths and positions of active nozzle groups in the print heads, the active nozzle groups representing those of the plurality of nozzles in the print heads which are used for printing, wherein said print head control means controls the positions of the active nozzle groups according to a set printing condition, the set printing condition being independent of print data to be printed.

22. An ink jet printing apparatus according to claim 21, wherein said print head control means controls the positions of the active nozzle groups in the print heads in such a way that an interval between the active nozzle groups in the plurality of print heads is set relatively short when a high speed print mode is selected and relatively long when a slow speed print mode is selected.

23. An ink jet printing apparatus according to claim 21, wherein said print head control means sets an interval between the active nozzle groups in the plurality of print heads equal to a width of one scan.

24. An ink jet printing apparatus according to claim 21, wherein said printing means reciprocally moves in a main scan direction relative to a print medium to perform a bidirectional printing which executes a printing operation in both a forward and a backward pass, and said print head control means sets the positions of the active nozzle groups in such a way that printing directions of the plurality of print heads are equal in one and the same print area.

25. An ink jet printing apparatus according to claim 21, wherein said printing means reciprocally moves in a main scan direction relative to a print medium to perform a bidirectional printing which executes a printing operation in both a forward and a backward pass, and
said print head control means sets the positions of the active nozzle groups in such a way that printing directions of the plurality of print heads differ in one and the same print area.

26. An ink jet printing apparatus according to claim 21, wherein said print head control means controls the positions of the active nozzle groups in the print heads in such a way that an interval between the active nozzle groups in the plurality of print heads is set relatively long when a normal print mode is selected and relatively short when a thinning out print mode is selected.

27. An ink jet printing method for printing on a print medium by ejecting different kinds of ink from a plurality of print heads arranged in a printing means, each of the print heads having a plurality of ink ejection nozzles, said ink jet printing method comprising:
a print head control step, of controlling, for each print head independently, widths and positions of active nozzle groups in the print heads, the active nozzle groups representing those of the plurality of nozzles in the print heads which are used for printing,
wherein said print head control step controls the positions of the active nozzle groups according to a set printing condition, the set printing condition being independent of print data to be printed.

28. An ink jet printing method according to claim 27, wherein said print head control step controls the positions of the active nozzle groups in the print heads in such a way that an interval between the active nozzle groups in the plurality of print heads is set relatively short when a high speed print mode is selected and relatively long when a slow speed print mode is selected.

29. An ink jet printing method according to claim 27, wherein said print head control step sets an interval between the active nozzle groups in the plurality of print heads equal to a width of one main scan.

30. An ink jet printing method according to claim 27, wherein said printing means reciprocally moves in a main scan direction relative to a print medium to perform a bidirectional printing which executes a printing operation in both a forward and a backward pass, and
said print head control step sets the positions of the active nozzle groups in such a way that printing directions of the plurality of print heads are equal in one and the same print area.

31. An ink jet printing method according to claim 27, wherein said printing means reciprocally moves in a main scan direction relative to a print medium to perform a bidirectional printing which executes a printing operation in both a forward and a backward pass, and
said print head control step sets the positions of the active nozzle groups in such a way that printing directions of the plurality of print heads differ in one and the same print area.

32. An ink jet printing method according to claim 27, wherein said print head control step controls the positions of the active nozzle groups in the print heads in such a way that an interval between the active nozzle groups in the plurality of print heads is set relatively long when a normal print mode is selected and relatively short when a thinning out print mode is selected.

33. An ink jet printing apparatus comprising:
printing means having a plurality of print heads, each having a plurality of ink ejection nozzles formed therein, the print heads ejecting different kinds of ink to print on a print medium; and
active head portion control means for controlling, for each print head independently, widths and positions of active head portions in the print heads and print timings of the print heads, the active head portions representing those of the plurality of nozzles in the print heads which are used for printing,
wherein said active head portion control means controls a print time interval between the plurality of the print heads in each of print areas according to a set printing condition.

34. An ink jet printing apparatus according to claim 33, wherein said active head portion control means controls the widths and positions of the active head portions in the print heads according to a high speed print mode or a high quality print mode set as a printing condition.

35. An ink jet printing apparatus according to claim 34, wherein said active head portion control means performs control such that the print time interval in each print area is constant when the high quality print mode is set.

36. An ink jet printing apparatus according to claim 35, wherein when the high quality print mode is set, said active head portion control means controls the widths and positions of the active head portions in the print heads to make the print time interval in each print area constant.

37. An ink jet printing apparatus according to claim 35, further comprising:
null skip means for detecting data representing successive blank portions, having no image data, in an image data to be printed in the sub-scan direction where a plurality of nozzles are arranged, resulting in performing no printing corresponding to said blank portions but feeding a print medium to where the image data exists in said sub-scan direction, wherein when the high quality print mode is set, said active head portion control means inhibits a null skip by means of said null skip means to make the print time interval in each print area constant.

38. An ink jet printing apparatus according to claim 33, wherein when the high quality print mode is set, said active head portion control means controls the widths and positions of the active head portions in the print heads to make equal directions in which the plurality of print heads print on each print area.

39. An ink jet printing apparatus according to claim 33, wherein when the high quality print mode is set, said active head portion control means makes the widths of main scans performed by the print heads in each print area constant.

40. An ink jet printing apparatus according to claim 33, wherein when the high quality print mode is set, said active head portion control means makes a print operation time taken by the print heads in each of the predetermined print areas equal to or greater than a predetermined time.

41. An ink jet printing apparatus according to claim 33, wherein the print heads generate bubbles in the inks by thermal energy and, based on the energy of the bubbles, eject the inks.

42. An ink jet printing method for printing on a print medium by ejecting different kinds of ink from a plurality of print heads, each having a plurality of ink ejection nozzles, the ink jet printing method comprising:

a active head portion control step, of controlling, for each print head independently, widths and positions of active head portions in the print heads and print timings of the print heads, the active head portions representing those of the plurality of nozzles in the print heads which are used for printing, wherein said active head portion control step controls a print time interval between the plurality of the print heads in each print area according to a set printing condition.

* * * * *

UNITED STATES PATENT AND TRADEMARK OFFICE
CERTIFICATE OF CORRECTION

PATENT NO. : 6,789,867 B2
DATED : September 14, 2004
INVENTOR(S) : Kiichiro Takahashi et al.

It is certified that error appears in the above-identified patent and that said Letters Patent is hereby corrected as shown below:

<u>Title page</u>,
Item [57], ABSTRACT,
Line 6, "purse," should read -- purpose, --.

<u>Drawings</u>,
Sheet 12, Figure 12, "5TH SCAN" should read -- 6TH SCAN --.

<u>Column 1</u>,
Line 59, "is" should read -- are --.

<u>Column 2</u>,
Line 38, "do" should read -- does --.

<u>Column 3</u>,
Line 17, "make" should read -- makes --.

<u>Column 6</u>,
Line 9, "heads" should read -- head --; and
Line 46, "a" should read -- an --.

<u>Column 15</u>,
Line 25, "the both" should read -- both the --.

<u>Column 28</u>,
Line 45, "consists" should read -- consist --.

UNITED STATES PATENT AND TRADEMARK OFFICE
CERTIFICATE OF CORRECTION

PATENT NO.     : 6,789,867 B2
DATED          : September 14, 2004
INVENTOR(S)    : Kiichiro Takahashi et al.

It is certified that error appears in the above-identified patent and that said Letters Patent is hereby corrected as shown below:

Column 35,
Line 1, "a active" should read -- an active --.

Signed and Sealed this

Thirtieth Day of November, 2004

JON W. DUDAS
*Director of the United States Patent and Trademark Office*